(12) United States Patent
Takahashi et al.

(10) Patent No.: US 6,741,534 B1
(45) Date of Patent: May 25, 2004

(54) INFORMATION RECORDING MEDIUM, INFORMATION RECORDING APPARATUS, INFORMATION RECORDING METHOD, INFORMATION REPRODUCING APPARATUS AND INFORMATION REPRODUCING METHOD

(75) Inventors: Hideki Takahashi, Kashiwa (JP); Kouki Tanoue, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 373 days.

(21) Appl. No.: 09/669,698

(22) Filed: Sep. 26, 2000

Related U.S. Application Data

(63) Continuation of application No. PCT/JP99/05009, filed on Sep. 14, 1999.

(30) Foreign Application Priority Data

Sep. 14, 1998 (JP) ............................................. 10-260273
Oct. 15, 1998 (JP) ............................................. 10-293193

(51) Int. Cl.⁷ .............................................. G11B 20/10
(52) U.S. Cl. ................................ 369/47.14; 369/53.15; 369/53.17; 369/275.3
(58) Field of Search ........................ 369/47.14, 53.15, 369/53.16, 53.17, 275.3

(56) References Cited

U.S. PATENT DOCUMENTS

| | | | | |
|---|---|---|---|---|
| 5,111,444 A | * | 5/1992 | Fukushima et al. | 369/53.17 |
| 5,235,585 A | * | 8/1993 | Bish et al. | 369/53.17 |
| 5,271,018 A | | 12/1993 | Chan | |
| 5,648,954 A | * | 7/1997 | Satoh | 369/53.17 |
| 5,715,221 A | * | 2/1998 | Ito et al. | 369/47.14 |
| 5,896,364 A | * | 4/1999 | Okazaki et al. | 369/275.3 |
| 6,160,778 A | * | 12/2000 | Ito et al. | 369/53.15 |
| 6,292,625 B1 | * | 9/2001 | Gotoh et al. | |
| 6,453,384 B1 | * | 9/2002 | Park et al. | 369/53.17 |
| 6,466,532 B1 | * | 10/2002 | Ko | 369/47.1 |
| 6,477,126 B1 | * | 11/2002 | Park et al. | 369/53.15 |

FOREIGN PATENT DOCUMENTS

| | | |
|---|---|---|
| EP | 0 350 920 | 1/1990 |
| EP | 0 798 710 | 10/1997 |
| JP | 9-251721 | 9/1997 |

\* cited by examiner

*Primary Examiner*—Doris H. To
*Assistant Examiner*—Jorge Ortiz Criado
(74) *Attorney, Agent, or Firm*—Oblon, Spivak, McClelland, Maier & Neustadt, P.C.

(57) ABSTRACT

An information recording medium of this invention includes a lead-in area, data area and lead-out area and further includes a user area which is an area defined in the data area and in which user data is recorded, a list management area which is an area defined in at least one area among the lead-in area and lead-out area, for storing a spare area list for defining a spare area for compensating for a defective area existing in the user area by a preset capacity in a preset position in the data area, and a spare area defined in the data area by the spare area list stored in the list management area.

7 Claims, 19 Drawing Sheets

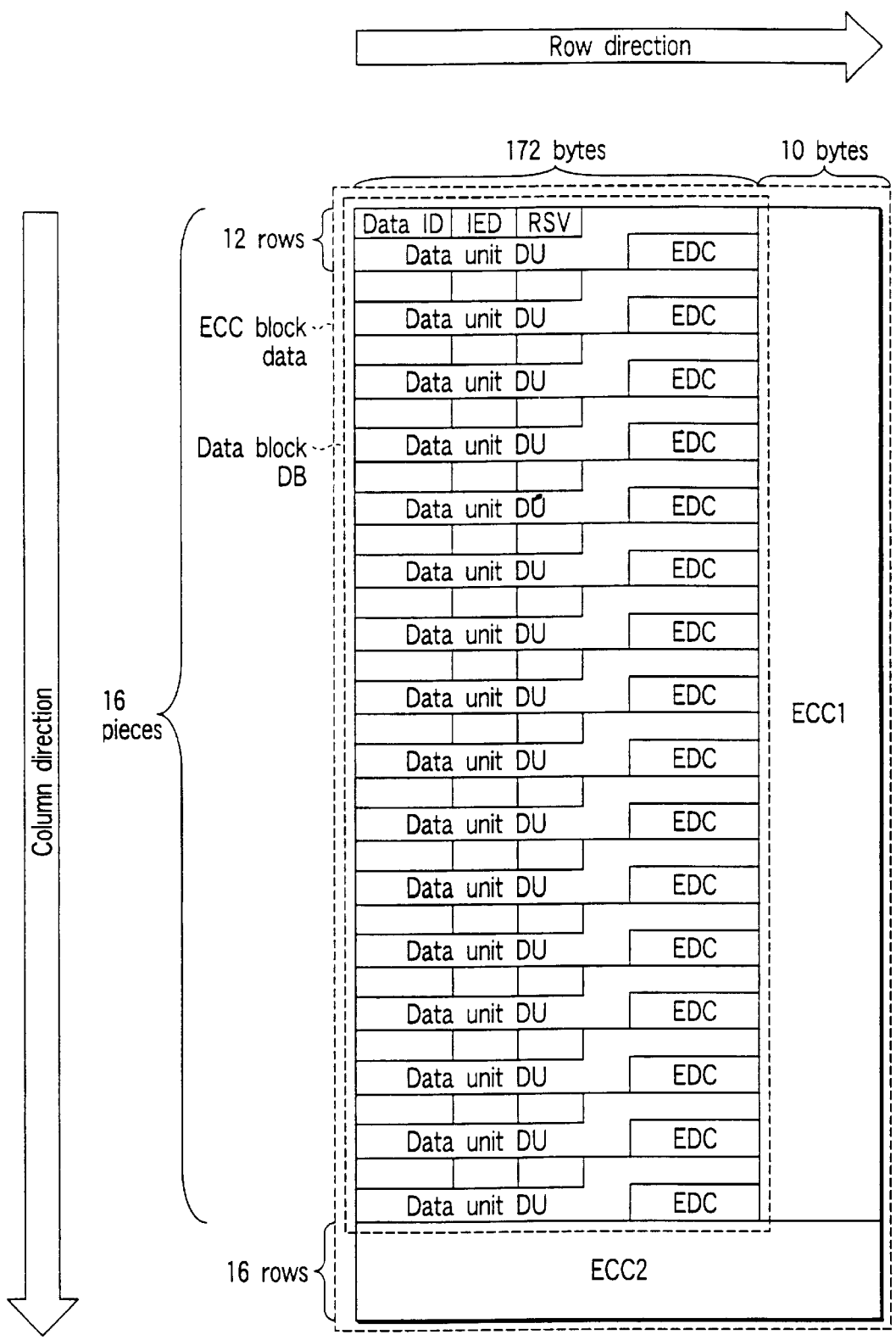
F I G. 3

INFORMATION RECORDING MEDIUM, INFORMATION RECORDING APPARATUS, INFORMATION RECORDING METHOD, INFORMATION REPRODUCING APPARATUS AND INFORMATION REPRODUCING METHOD

CROSS-REFERENCE TO RELATED APPLICATIONS

This is continuation of Application No. PCT/JP99/05009, filed Sep. 14, 1999.

This application is based upon and claims the benefit of priority from the prior Japanese Patent Applications No. 10-260273, filed Sep. 14, 1998; and No. 10-293193, filed Oct. 15, 1998, the entire contents of which are incorporated herein by reference.

BACKGROUND OF THE INVENTION

This invention relates to an information recording medium such as a DVD (Digital Video Disk) having a feature of high-density recording. Further, it relates to an information recording apparatus and information recording method for recording preset information on the above information recording medium. Further, it relates to an information reproducing apparatus and information reproducing method for reproducing preset information recorded on the above information recording medium.

In recent years, a DVD having a feature of high-density recording is actively studied and developed. The DVD is roughly divided into a DVD-ROM only for reproduction and a rewritable DVD-RAM. In the DVD-RAM, a lead-in area, data area and lead-out area are provided. Further, in the data area, a user area in which user data is recorded and a spare area for compensating for a defective area existing in the user area are provided. The position and storage capacity of the spare area are determined by a format which is previously standardized. Then, the defective area is compensated for by use of the spare area by the replacement process.

However, since the position and memory capacity of the spare area which is not always necessary are determined by the previously standardized format as described above, there occurs a problem that the position and memory capacity of the spare area are fixedly set and the data area is prevented from being effectively utilized.

BRIEF SUMMARY OF THE INVENTION

An object of this invention is made based on the above problem and it is to provide an information recording medium, information recording apparatus, information recording method, information reproducing apparatus and information reproducing method as follows.

(1) An information recording medium capable of suppressing a reduction in the effective sp ace of a data area due to the arrangement of a spare area in a case wherein the spare area is arranged in the data area as a replacement area.

(2) An information recording apparatus and information recording method for replacement-recording preset information with respect to an information recording medium capable of suppressing a reduction in the effective space of a data area due to the arrangement of a spare area in a case wherein the spare area is arranged in the data area as a replacement area.

(3) An information reproducing apparatus and information reproducing method for reproducing preset information replacement-recorded on an information recording medium capable of suppressing a reduction in the effective space of a data area due to the arrangement of a spare area in a case wherein the spare area is arranged in the data area as a replacement area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a schematic diagram showing the structure of ECC block data recorded on the optical disk shown in FIG. 1;

DETAILED DESCRIPTION OF THE INVENTION

There will now be described an embodiment of this invention in detail with reference to the accompanying drawings.

First, the outline of an optical disk (DVD-RAM disk) as an information recording medium according to this invention is explained with reference to FIG. 1.

Figure 1:
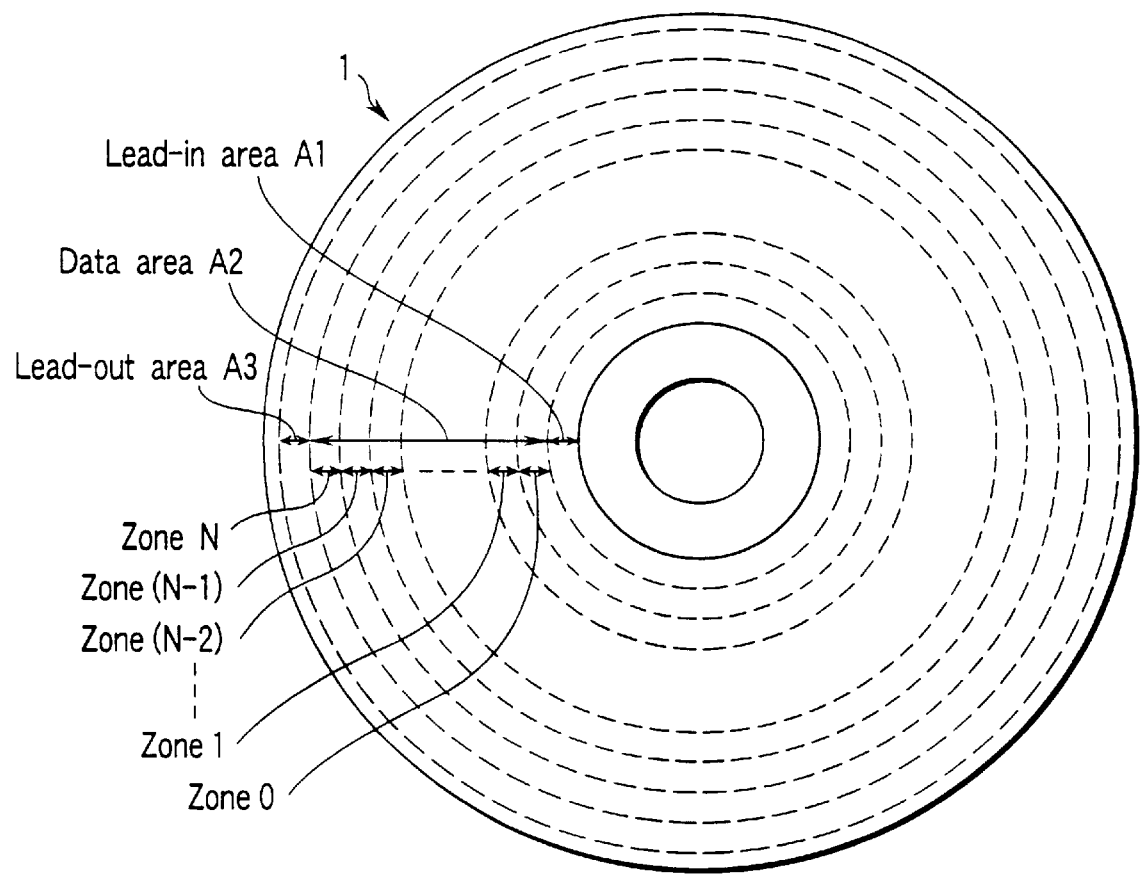
FIG. 1 is a schematic view showing the data structure on an optical disk (DVD-RAM) according to this invention.

FIG. 1 is a view showing the arrangement of a lead-in area, data area, lead-out area and the like on the optical disk.

As shown in FIG. 1, in an optical disk 1, a lead-in area A1, data area A2 and lead-out area A3 are sequentially arranged in an order from the inner peripheral side. In the lead-in area A1, an emboss data zone, mirror zone (no-recording zone) and rewritable data zone are provided. In the data area A2, a rewritable data zone is provided and a plurality of zones, a zone 0 to a zone N (for example, N=34) are provided in the rewritable data zone. In the lead-out area A3, a rewritable data zone is provided.

In the emboss data zone of the lead-in area A1, a reference signal and control data are emboss-recorded at the time of manufacturing of the optical disk 1. In the rewritable data zone of the lead-in area A1, identification data for identifying the type of a disk and defect management data for managing a defect area are recorded. In this case, an area in which the defect management data is recorded is set as a defect management area (DMA:Defect Management Area). In the rewritable data zone of the lead-out area A3, data which is the same data recorded in the rewritable data zone of the lead-in area A1 is recorded.

The emboss data zone provided in the lead-in area A1 is constructed by a plurality of tracks and each track is constructed by a plurality of sector fields. Further, the zone is processed at a preset rotation speed.

The rewritable data zone provided in the lead-in area A1 and the zone 0 of the rewritable data zone provided in the data area A2 are formed of X tracks and each track is constructed by Y sector field's. Further, the zone is processed at a rotation speed Z0 (Hz).

The zone 1 of the rewritable data zone provided in the data area A2 is formed of X tracks and each track is constructed by (Y+1) sector fields. Further, the zone is processed at a rotation speed Z1 (Hz) (Z0>Z1).

The zone 2 of the rewritable data zone provided in the data area A2 is formed of X tracks and each track is constructed by (Y+2) sector fields. Further, the zone is processed at a rotation speed Z2 (Hz) (Z1>Z2).

Likewise, the zone 3 to zone N of the rewritable data zone provided in the data area A2 are each formed of X tracks. Each track of the zone 3 is constructed by (Y+3) sector fields and each track of the zone 4 is constructed by (Y+4) sector fields. That is, each track of the zone N is constructed by (Y+N) sector fields. Further, the zone 3 is processed at a rotation speed Z3 (Hz) (Z2>Z3) and the zone 4 is processed at a rotation speed Z4 (Hz) (Z3>Z4). That is, the zone N is processed at a rotation speed ZN (Hz) (Z(N−1)>ZN).

The rewritable data zone provided in the lead-out area A3 is formed of a plurality of tracks and each track is constructed by (Y+N) sector fields. Further, the zone is processed at a rotation speed ZN (Hz).

As described above, the number of sector fields for one track is sequentially increased from the zone on the inner peripheral side of the optical disk 1 and the rotation speed is lowered. That is, the optical disk 1 is a disk used for a ZCLV (Zone Constant Linear Velocity) system.

Figure 2:
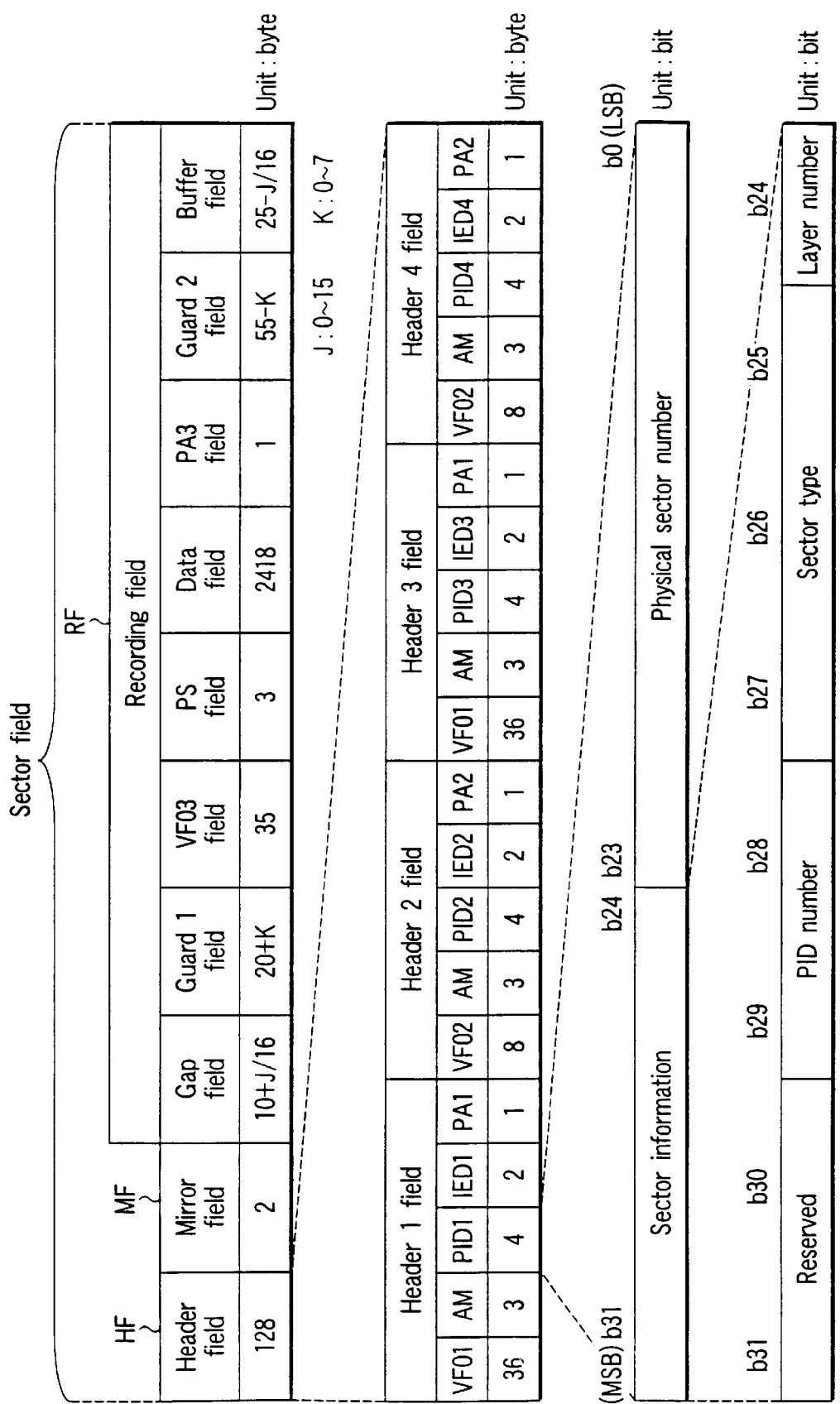
FIG. 2 is a schematic diagram showing the format of a sector field on the optical disk (DVD-RAM) shown in FIG. 1.

Next, with reference to FIG. 2, the format of the sector field on the DVD-RAM disk is explained.

As shown in FIG. 2, one sector field is constructed by 2687 bytes. In the sector field, data modulated by 8-16 modulation is recorded. The 8-16 modulation is a modulation system for modulating an 8-bit input code series into a 16-bit output code series. The input code series is called an input bit and the output code series is called a channel bit. Incidentally, one byte has the same meaning as 16 channel bits.

In this case, the contents of one sector field are explained. One sector field is constructed by a header field HF of 128 bytes, a mirror field MF of 2 bytes and a recording field RF of 2567 bytes.

In the header field HF, header data is emboss-recorded at the time of manufacturing of the optical disk. In the header field HF, header data is overwritten four times in order to enhance the detection precision of the header data. That is, in the header field HF, a header 1 field, header 2 field, header 3 field and header 4 field are contained. The header 1 field and header 3 field are constructed by 46 bytes. The header 2 field and "header 4" field are constructed by 18 bytes.

In the header 1 field, a 36-byte VFO (Variable Frequency Oscillator) 1, 3-byte AM (Address,Mark), 4-byte PID (Physical ID) 1, 2-byte IED (ID Error Detection Code) 1, one-byte PA (Post Ambles) 1 are contained.

In the header 2 field, an 8-byte VFO2, 3-byte AM, 4-byte PID2, 2-byte IED2, one-byte PA2 are contained.

In the header 3 field, a 36-byte VFO1, 3-byte AM, 4-byte PID3, 2-byte IED3, one-byte PA1 are contained.

In the header 4 field, an 8-byte VFO2, 3-byte AM, 4-byte PID4, 2-byte IED4, one-byte PA2 are contained.

In the PID1, PID2, PID3 and PID4, sector information and physical sector numbers (physical addresses) are contained. In the VFO1 and VFO2, successive repetition patterns (100010001000 . . . ) for a PLL (Phase Locked Loop) process are contained. In the AM, a special pattern (address mark) which violates the run-length limitation for indicating the PID position is recorded. In the IED1, IED2, IED3 and IED4, error detection codes for detecting PID errors are contained. In the PA, state information necessary for demodulation is contained and it has a role of polarity adjustment to permit the header field HF to end at the space. The mirror field MF is a mirror surface field.

The recording field RF is a field in which user data is mainly recorded. In the recording field, a (10+J/16)-byte gap field, (20+K)-byte guard 1 field, 35-byte VFO 3 field, 3-byte PS (pre-synchronous code) field, 2418-byte data field (user data field), one-byte post amble PA 3 field, (55−K)-byte guard 2 field and (25−J/16)-byte buffer field are contained. Incidentally, J and K respectively take random values of integral numbers of 0 to 15 and 0 to 7. Therefore, the position in which data is started to be written is shifted in a random manner. As a result, deterioration of the recording film due to overwriting can be reduced.

In the gap field, nothing is recorded. The guard 1 field is a discarding area for absorbing starting-end deterioration of repetitive overwriting inherent to a phase change recording film. The VFO3 field is a PLL locking field and plays a role of inserting a synchronous code into the same pattern and attaining synchronization with the byte boundary. The PS field is a field in which the synchronous code is recorded.

The data field is a field in which data ID, data ID error correction code IED (Data ID Error Detection Code), synchronous code, ECC (Error Collection Code), error detection code EDC (Error Detection Code), user data of 2048 bytes and the like are recorded. In the data ID, a logical sector number (logical address) is contained. The data ID error correction code IED is an error correction code of 2-byte (16-bit) configuration for data ID.

The post amble PA3 field contains state information necessary for demodulation and is a field indicating the end of the last byte of the preceding data field. The guard 2 field is a field provided for preventing termination-end deterioration at the time of repetitive recording inherent to a phase change recording medium from influencing on the data field. The buffer field is a field provided for absorbing a variation in the rotation of a motor which rotates the optical disk 1 so as to prevent the data field from extending over the next header field.

Next, PID1, PID2, PID3 and PID4 are concretely explained. In each PID, 8-bit sector information and 24-bit physical sector number are contained. In the physical sector number, address data indicating an absolute position of the sector field is recorded. In the sector information, information such: as 2-bit reserve, 2-bit PID number, 3-bit sector type and 1-bit layer number is contained. The reserve is a non-recording area. In the PID number, a PID number is recorded. For example, "00" indicating the PID1 is recorded in the PID number in the header 1 field, "01" indicating the PID2 is recorded in the PID number in the header 2 field, "10", indicating the PID3 is recorded in the PID number in the header 3 field, and "11" indicating the PID4 is recorded in the PID number in the header 4 field.

In the sector type, "000", indicating a read only sector (Read only sector), "001", "010", or "011", indicating a reserve sector (Reserved), "100" indicating a rewritable first sector (Rewritable first sector) of a land or groove track, "101" indicating a rewritable last sector (Rewritable last sector) of a land or groove track, "110" indicating a rewritable before last sector (Rewritable before last sector) of a land or groove track, and "111" indicating other rewritable sectors (Rewritable other sector) of a land or groove track are recorded.

In the layer number, "1" or "0" indicating a layer 1 or 0 is recorded.

Figure 4:
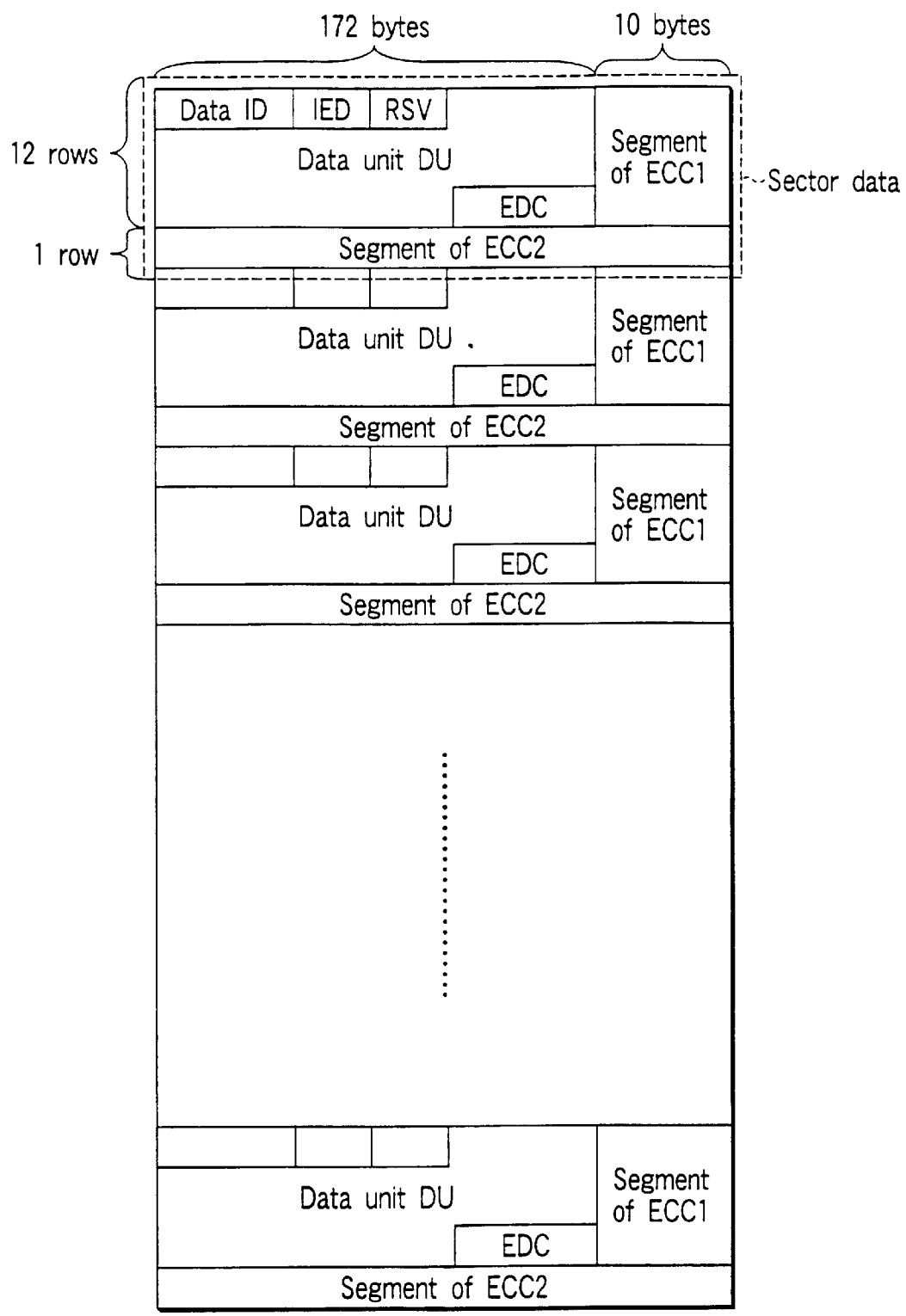
FIG. 4 is a schematic diagram showing the data structure of sector data recorded in a data field shown in FIG. 2.

Next, with reference to FIGS. 3 and 4, the structure of data recorded on a DVD-RAM and the structure of data reproduced from the DVD-RAM are explained. FIG. 3 is a diagram schematically showing the structure of ECC block data. FIG. 4 is a diagram schematically showing the data structure of sector data recorded in the data field shown in FIG. 2.

In the DVD-RAM, tracks in which data is recorded are formed and a plurality of sector fields in which data of a preset unit is recorded are formed in the track. Further, in the DVD-RAM, format data called ECC block data is recorded. Strictly speaking, 16 sector data items created based on the ECC block data are dispersedly recorded in the 16 sector fields. More specifically speaking, a lump of sector data is recorded in the 2418-byte data field shown in FIG. 2.

As shown in FIG. 3, ECC block data is constructed by a data block DB (containing user data), ECC1 and ECC2.

The data block DB is constructed by data items arranged along a preset number of rows and columns and the data block DB can be divided into 16 data units DU. More specifically speaking, the data block DB is constructed by data of 172 (the number of bytes)×12 (the number of rows constructing the data unit)×16 (the number of data units constructing the data block). The data unit DU is constructed by data of 172 (the number of bytes)×12 (the number of rows constructing the data unit). Further, in the data unit DU, data ID, data ID error correction code IED, error detection code EDC, 2048-byte user data and the like are contained. The data ID is utilized for scrambling of the user data contained in the data unit DU. The error detection code EDC is used to detect an error contained in a collection of part of data in the data unit.

ECC1 is used for correcting an error contained in data in the row direction (lateral direction) among the data block DB. More specifically speaking, ECC1 is constructed by data of 10 (bytes)×12 (the number of rows constructing the data unit DU)×16 (the number of data units DU constructing the data block DB).

ECC2 is used for correcting an error contained in data in the column direction (longitudinal direction) among the data block DB. More specifically speaking, ECC2 is constructed by data of {172 (bytes)+10 (bytes)}×16 (the number of data units DU constructing the data block DB). ECC2 has an error correction ability of generally correcting an error of up to eight bytes and correcting an error of up to sixteen bytes at the time of loss correction.

Next, the sector data is explained with reference to FIG. 4.

Sixteen sector data items are created from one ECC block data item. One sector data item is constructed by the data unit DU, part of ECC1 attached to the data unit DU and part of ECC2. More specifically speaking, the sector data is constructed by data of {172 (bytes)+10 (bytes)}×12 (the number of rows constructing the data unit DU)+1 (one row of ECC2).

Figure 12A:
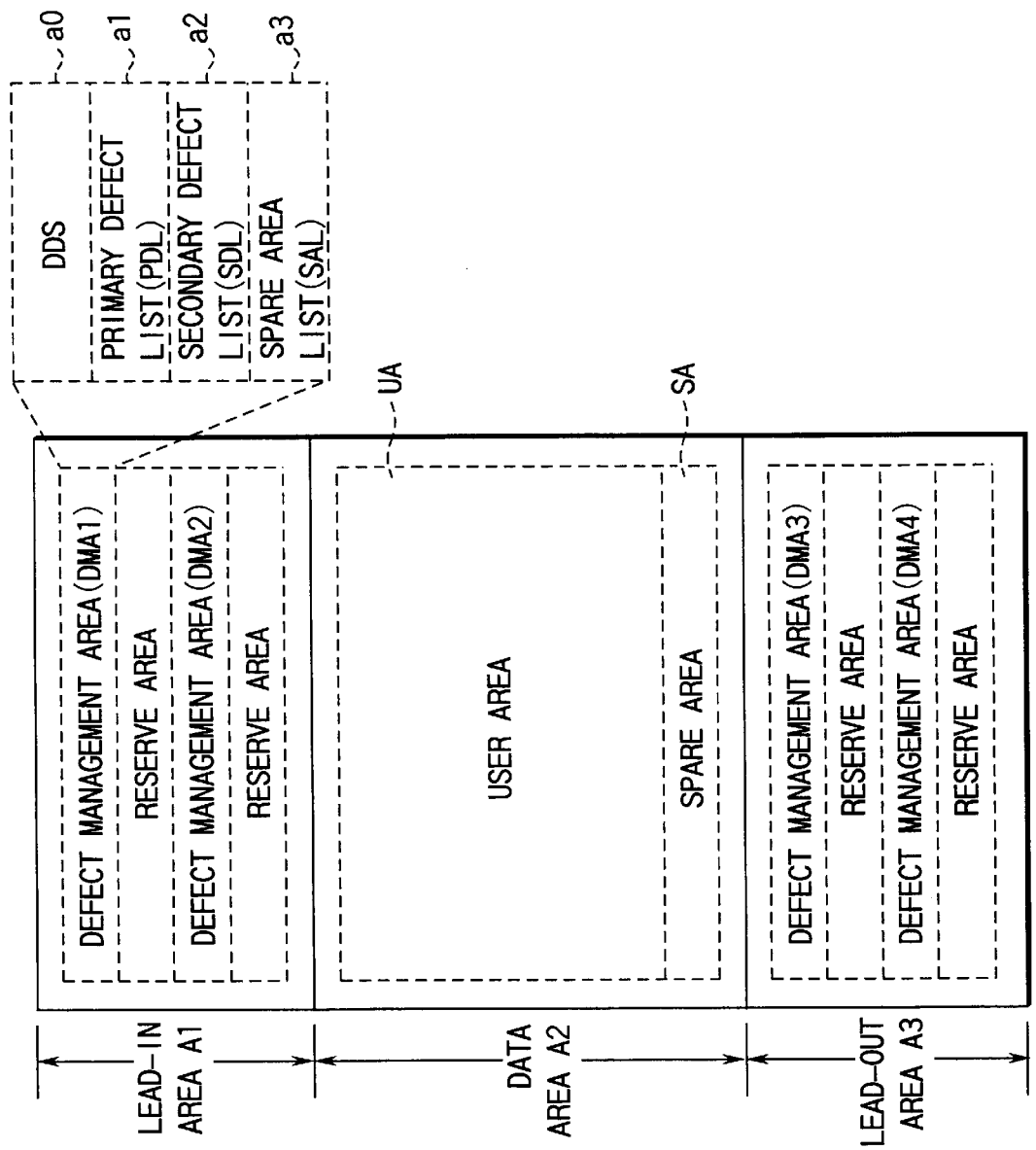
FIG. 12A is a schematic diagram showing a first example of the data structure on the optical disk (DVD-RAM) according to this invention, particularly the data structure of a defect management area (DMA)

Next, the data structure of a defect management area is explained with reference to FIGS. 12A and 12B.

First, the data structure of the defect management area is explained with reference to FIG. 12A. Four defect management areas are provided in total on an optical disk and the same data is recorded in each of the four defect management areas. Two (DMA1 to 2) of the four defect management areas (DMA1 to 4) are provided in a lead-in area and the remaining two areas are provided in a lead-out area (DMA3 to 4).

In the defect management areas (DMA1 to 4), an area a0 to area a3 are provided. In the area a0, a DDS (Disc Definition Structure) is stored. In the area a1, a primary defect list (PDL: Primary Defect List) is entered. In the area a2, a secondary defect list (SDL: Secondary Defect List) is entered. In the area a3, a spare area list (SAL: Spare Area List) is entered.

Figure 12B:
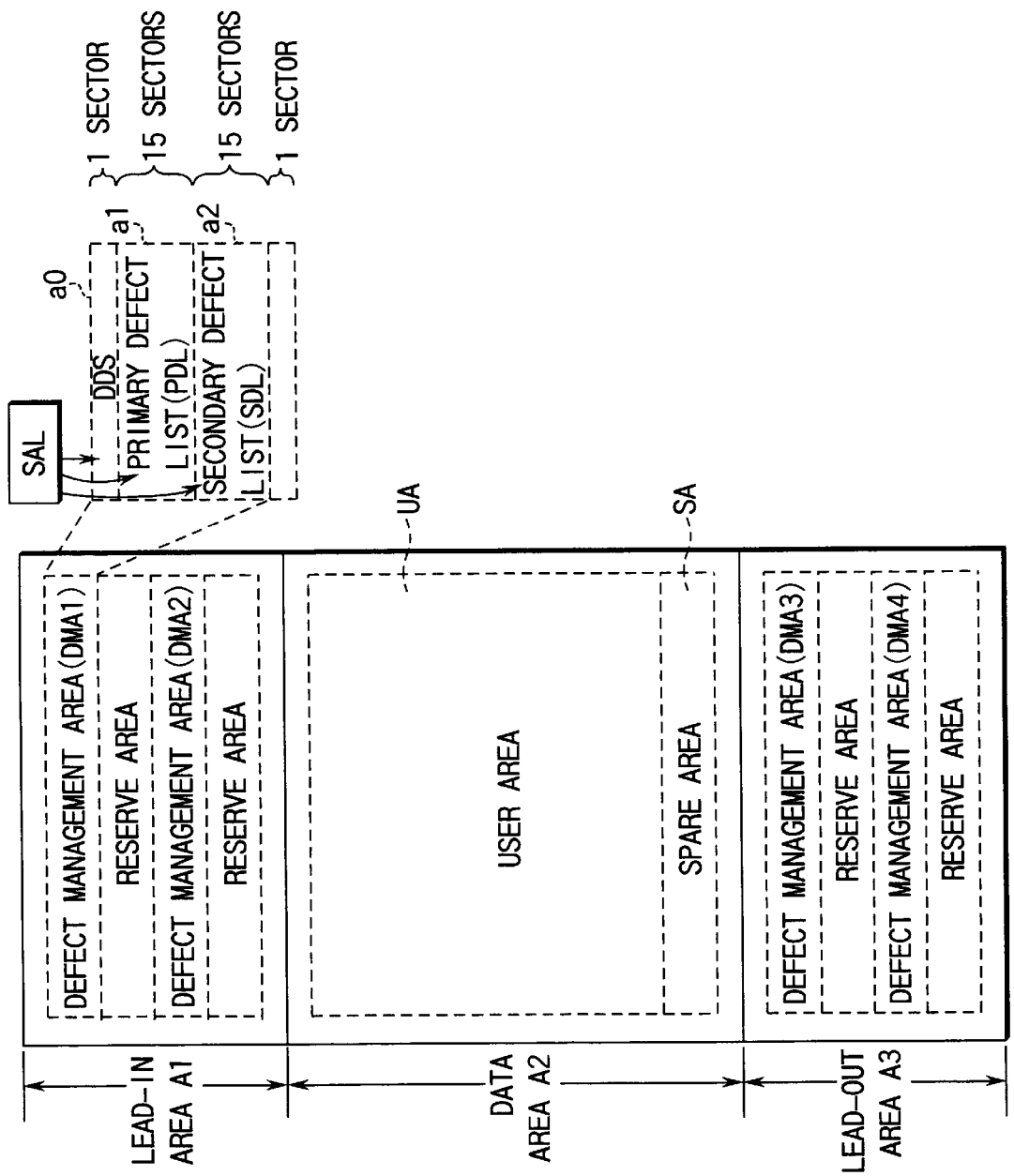
FIG. 12B is a schematic diagram showing a second example of the data structure on the optical disk (DVD-RAM) according to this invention, particularly the data structure of a defect management area (DMA)

Other than the above described areas, a DMA (DMA1 to 4) of the data structure as shown in FIG. 12B can be used. The data structure is a data structure in which the DMA (DMA1 to 4) contains the area a0 to area a2 (the area a3 is not contained). Like the above case, a DDS is stored in the area a0. In the area a1, a primary defect list is entered. In the area a2, a secondary defect list entered. In an at least one space area of the DDS in the area a0, PDL in the area a1 and SDL in the area a2, an SAL is entered. In this case, it is not necessary to expressly provide the area a3 for the SAL.

In either case, the SAL is entered in some area on the optical disk.

Figure 5:
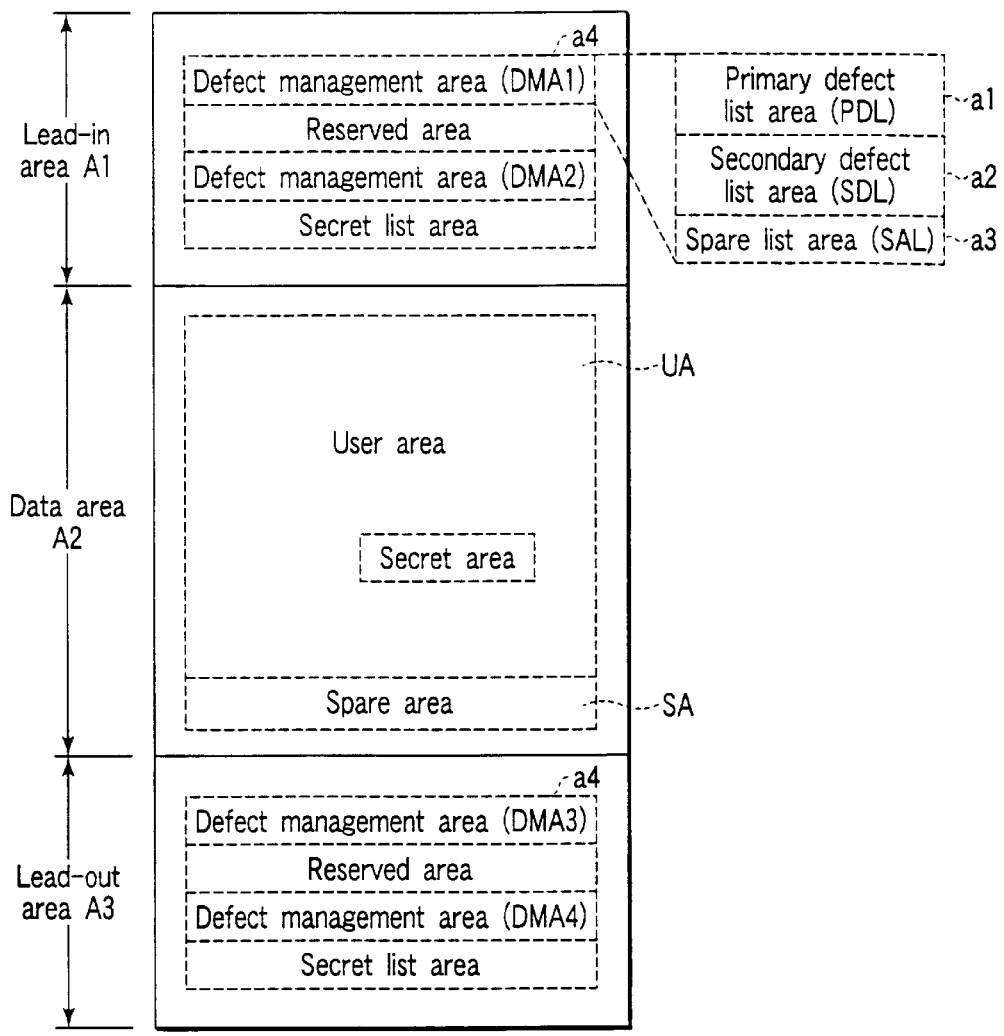
FIG. 5 is a schematic diagram showing the data structure of a primary defect list to be entered into a primary defect list area.
Figure 6:
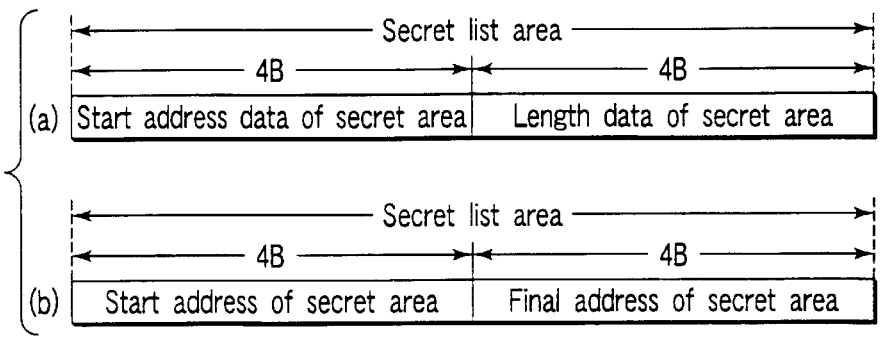
FIG. 6 is a schematic diagram showing the data structure of a secondary defect list to be entered into a secondary defect list area.
Figure 7:
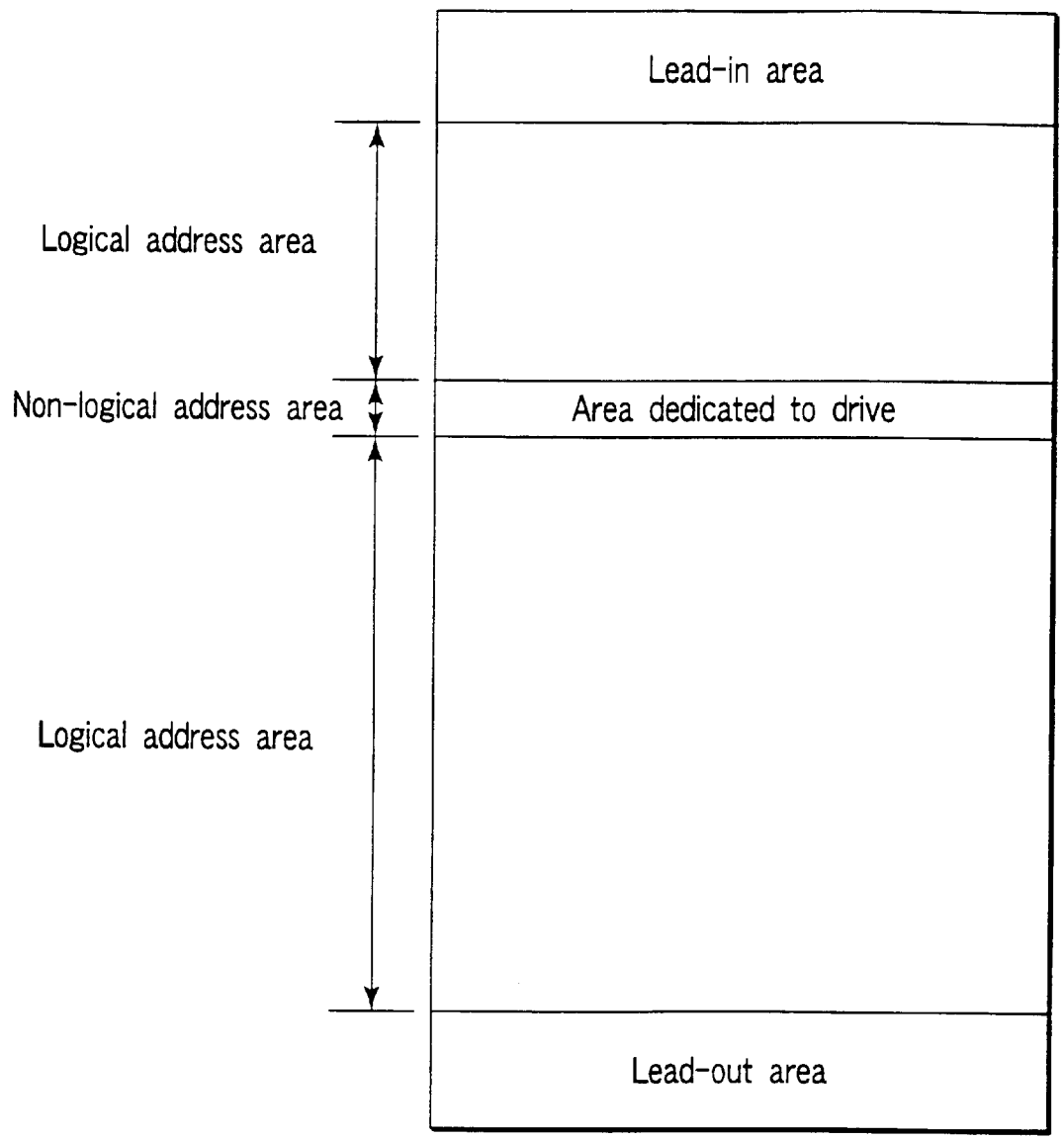
FIG. 7A is a schematic diagram showing a first example of the data structure of a spare list to be entered into a spare list area.
FIG. 7B is a schematic diagram showing a second example of the data structure of the spare list to be entered into the spare list area.
Figure 7A:
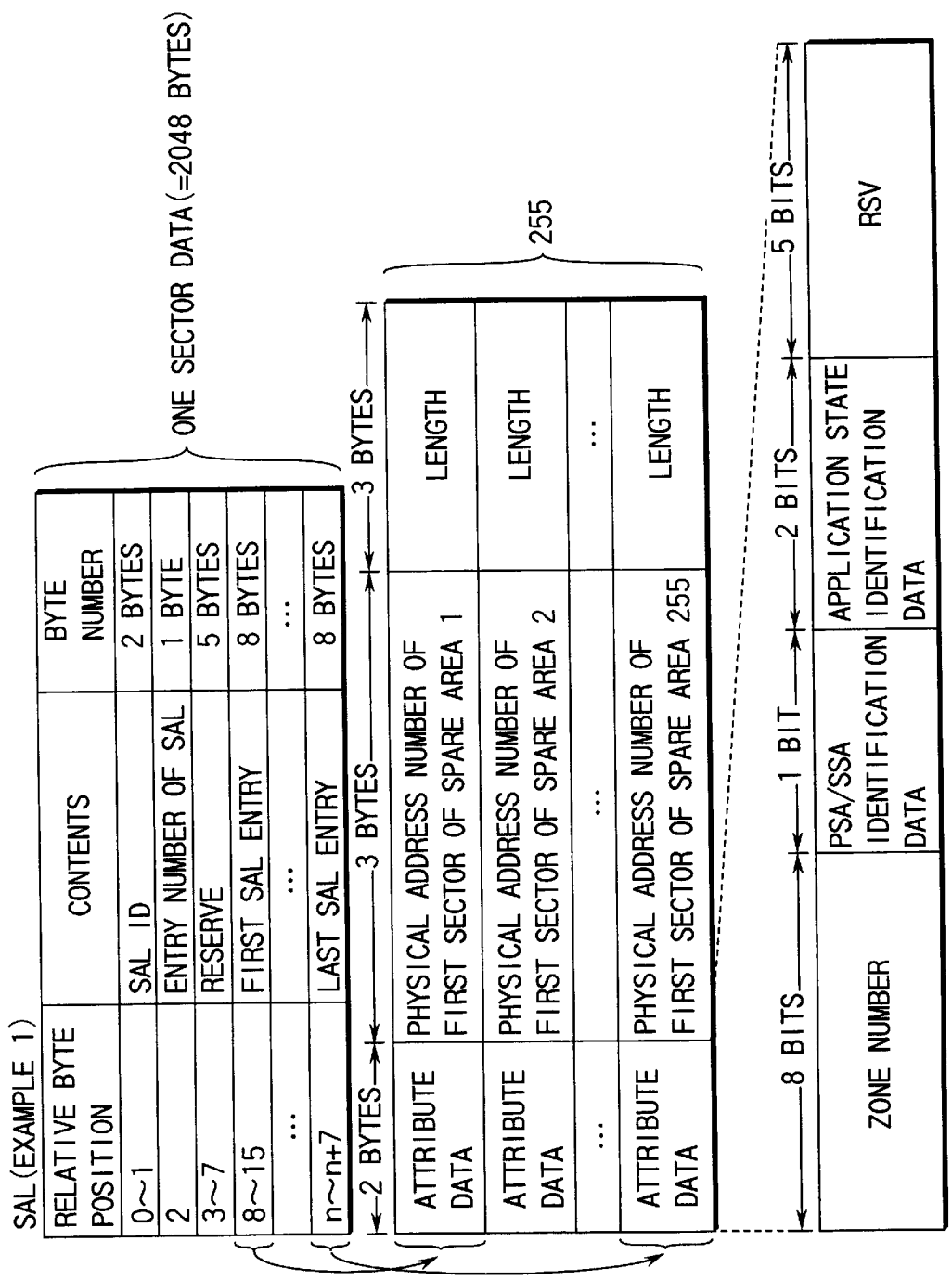
Figure 7B:
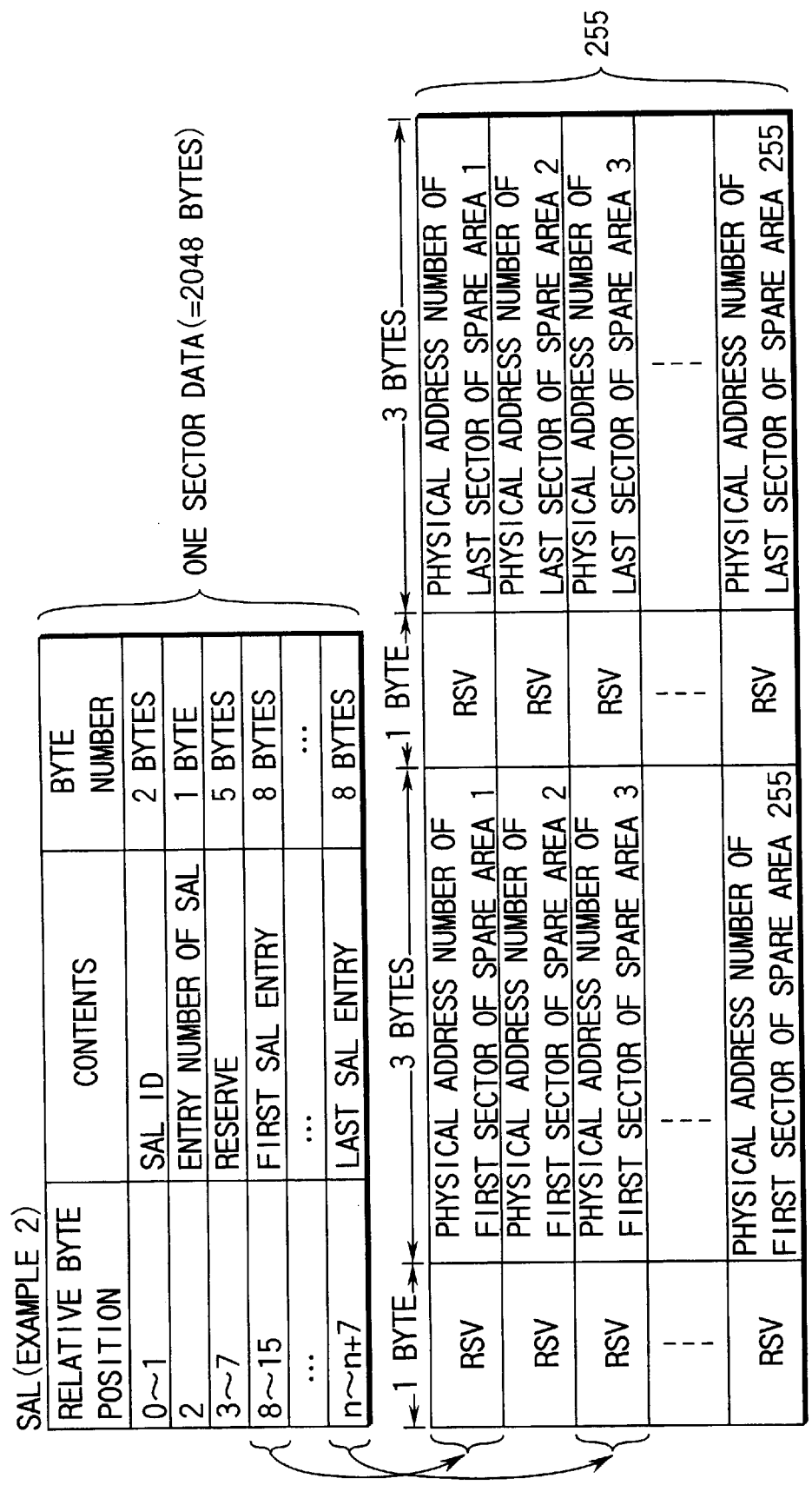

FIG. 5 is a diagram showing the outline of the data structure of the primary defect list. FIG. 6 is a diagram showing the outline of the data structure of the secondary defect list. FIGS. 7A and 7B are diagrams showing the outline of the data structure of the spare area list.

As shown in FIG. 5, in the primary defect list, an area in which an entry type indicating the type of entry is recorded, a reserved area and an area in which a physical sector number of a defect sector (indicating a sector field containing a defect) is recorded are contained in an order from the head.

As shown in FIG. 6, in the secondary defect list, an area in which an allocation mark (FRM) is recorded, a reserved area, an area in which a physical sector number of a first sector (indicating a first sector field among the 16 sector fields constructing a defective block) of a defective block is recorded, a reserved area, and an area in which a physical sector number of a first sector (indicating a first sector field among the 16 sector fields constructing a replacement block) of a replacement block is recorded are contained in an order from the head.

AS shown in the upper stage of FIG. 7A and in the upper stage of FIG. 7B, in the spare area list constructed by one sector data (=2028 bytes), spare area ID (2 bytes), the entry number of the spare area list (one byte), reserve (7 bytes), entry (8 bytes) of the first SAL, . . . , and entry (8 bytes) of the last SAL are sequentially contained. The entry of the first SAL is the first entry and the entry of the last SAL is a 255th entry. That is, in the spare area list, 255 spare areas at maximum are entered (spare areas in 255 positions can be managed by use of one sector) as shown in the middle stage of FIG. 7A and in the lower stage of FIG. 7B.

As shown in the middle stage of FIG. 7A, in each spare area list, attribute data (2 bytes), a physical address number (3 bytes) of a sector in a start position of an spare area n, and length data (3 bytes) of the spare area n are sequentially contained.

Instead of the length data, a physical address number (3 bytes) of a sector in an end position of the spare area n may be used. In this case, for example, as shown in the lower stage of FIG. 7B, in each spare area list, RSV (one byte), the physical address number (3 bytes) of the sector in the start position of the spare area n, RSV (one byte), and the physical address number (3 bytes) of the sector in the end position of the spare area n may be sequentially contained.

The physical address number of the sector in the start position of the spare area n indicates a start address indicating the start position of the spare area n. The length data of the spare area n indicates the data length of the spare area n. That is, the arrangement location and capacity of the spare area n can be determined by the physical address number of the sector in the start position of the spare area n and the length data of the spare area n. Further, the physical address number of the sector in the end position of the spare area n indicates an end address indicating the end position of the spare area n.

As shown in the lower stage of FIG. 7A, in the attribute data, a zone number as first attribute data (8 bits), PSA/SSA identification data as second attribute data (one bit), application state identification data as third attribute data (2 bits), and 5-bit reserve (RSV) are contained. The first attribute data may be increased/decreased according to the zone number.

The first attribute data indicates a zone number in which the spare area n is arranged. It becomes possible to determine an optimum spare area at high speed by indicating the arrangement destination of the spare area n by use of not only the address but also the zone number. It is advantageous to complete the replacement process in the same zone in view of the access speed or the like. The replacement process is explained later in detail.

The second attribute data specifies one of PSA (Primary Spare Area) and SSA (Supplementary Spare Area) which corresponds to the area. For example, the PSA is set as an area allocated immediately after certification and the SSA is set as an area allocated in the user area when the spare area becomes non-available (when the spare area is full).

For example, the PSA is indicated when the second attribute data is "0" and the SSA is indicated when it is "1". Physical addresses are allocated to the sector fields provided in the entire area on the optical disk, that is, in the lead-in area A1, data area A2 and lead-out area A3. On the other hand, logical addresses are determined after the format process is effected and given to the sector fields other than the sector fields of the physical addresses registered to the PDL. However, in principle, no logical address is allocated to the PSA (except a case wherein it is allocated in the replacement process). The SSA is set in an area in which the logical address is allocated in one case and is set in an area in which no logical address is allocated in the other case. In the former case, unlike the PSA, the logical address is allocated to the SSA. In the latter case, like the PSA, nonlogical address is allocated to the SSA. In the former case, it is not necessary for a host device to store the position of the SSA.

In a case where data is recorded in the SSA to which the logical address is allocated, attention becomes necessary. Generally, data is not recorded in the SSA except a case wherein data accompanied by the replacement process is recorded. However, in a case where data on the disk is re-arranged by a tool for optimizing the disk, the SSA to which the logical address is allocated is treated as an object to be re-arranged and data which is not accompanied by the replacement process may be recorded in the SSA to which the logical address is allocated. In order to prevent this accident, the SSA to which the logical address is allocated is made identifiable and re-arrangement of the SSA and recording of data which is not accompanied by the replacement process into the SSA ard inhibited by causing the spare area list to have the above second attribute data (PSA/SSA identification data). Strictly speaking, every recording of data which is not accompanied by the replacement process into the SSA by an optical disk drive and a host device is inhibited.

Further, also for address calculation (calculation for the logical address), the second attribute data (PSA/SSA identification data) is necessary. As described above, in the PSA, the logical address is not allocated. Therefore, the logical addresses of the normal sector fields arranged before and after the PSA are successive. For example, if a logical address (k) is allocated to the normal sector field arranged immediately before the PSA, a logical address (k+1) is allocated to the normal sector field arranged immediately after the PSA. On the other hand, the logical addresses of the normal sector fields arranged before and after the SSA are not successive. For example, if a logical address (m) is allocated to the normal sector field arranged immediately before the SSA, a logical address (m+1) is allocated to the normal sector field arranged in the head portion of the SSA. Further, if a logical address (m+n+1) is allocated to the normal sector field arranged in the end portion of the SSA, a logical address (m+n+2) is allocated to the normal sector field arranged immediately after the SSA. Because of the above difference, it becomes necessary to identify the PSA and SSA at the time of address calculation. Since the PSA and SSA can be identified based on the second attribute data, the address calculation can be precisely effected.

The third attribute data is data indicating the application state of the spare area n. For example, if the third data is "00", it indicates that the spare area n is not used yet, if it is "01", it indicates that part of the spare area n is now used, and if it is "11", it indicates that the spare area n is already used (no available space). "10" indicates non-definition (reserve).

Figure 15:
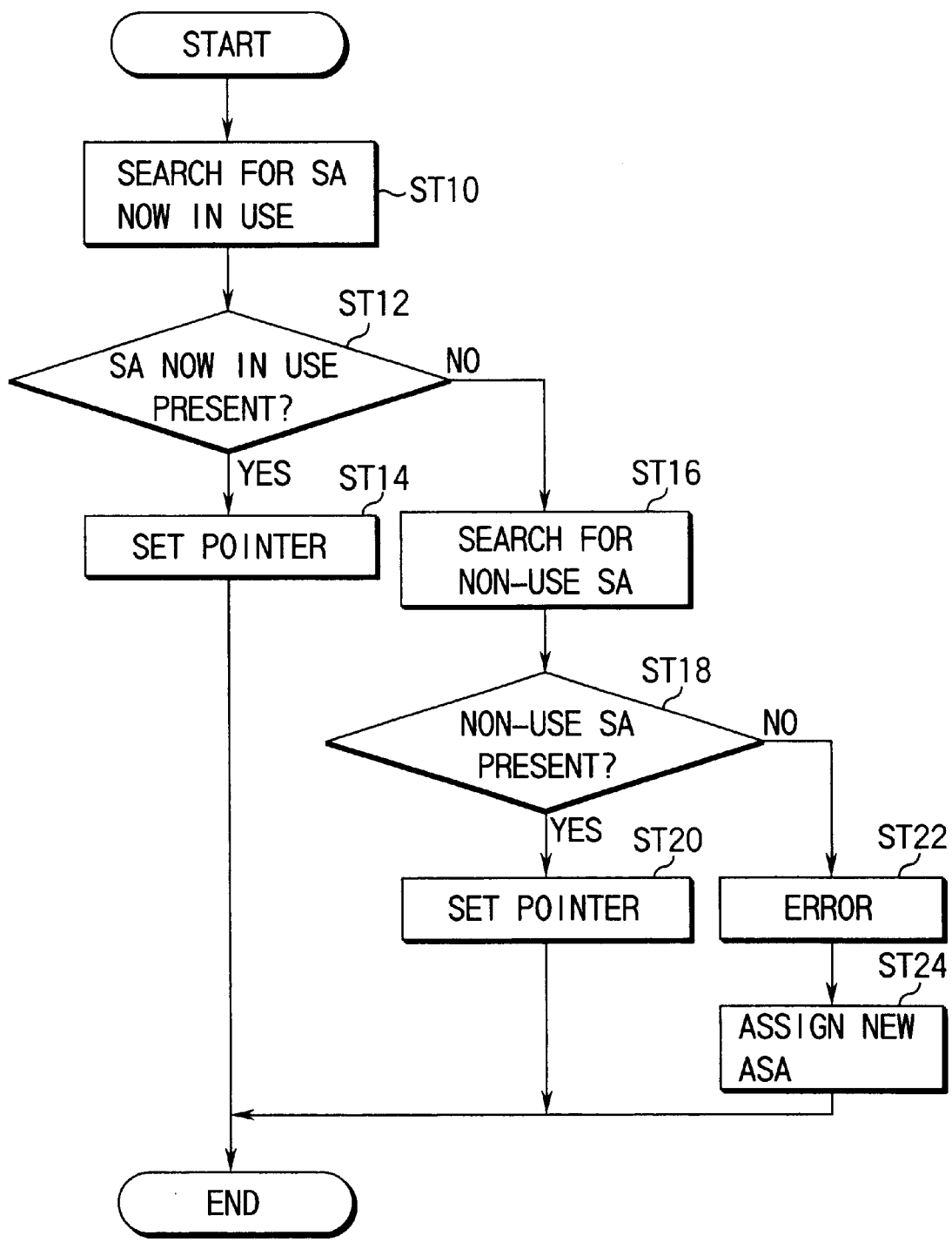
FIG. 15 is a flowchart for illustrating searching for a target spare area.

Now, a process for the spare area utilizing the third attribute data is explained with reference to the flowchart shown in FIG. 15. For example, a case wherein the replacement process is necessary in a zone n is taken as an example and explained. First, a spare area which is arranged in the zone n and now partly used is searched for based on the first and third attribute data items (ST10). At this time, if a spare area which is arranged in the zone n and now partly used is detected (ST12, YES), a pointer is set in the detected spare area. It is assumed that two or more pointers are not set in one zone. This is because the process will not be made complicated. If the spare area which is arranged in the zone n and now partly used is not detected (ST12, NO), a non-use spare area is searched for (ST16). At this time, if the spare area which is arranged in the zone n and is not used is detected (ST16, YES), a pointer is set in the detected spare area. If the spare area which is arranged in the zone n and is not used is not detected (ST16, NO), an error is determined (ST22) and the SSA is newly allocated. At this time, the zone n is preferentially selected as an allocation destination. In other words, the zone in which the already used spare area (full-state spare area) is arranged is preferentially selected as an allocation destination. Since the spare area is allocated to such a preset position, an SSA allocation position can be specified from the drive device (having a concept of a zone) to the host device (having no concept of a zone). Further, by allocating the SSA to such a preset position, the replacement process in the same zone can be made possible. Further, the capacity of the newly allocated SSA is variable and SSA allocation is effected in the unit of 1 megabyte, for example. As is explained with reference to the flowchart shown in FIG. 15, the spare area can be prevented from becoming a vermiculated state by preferentially selecting a spare area which is now partly used rather than a non-use spare area.

Figure 13:
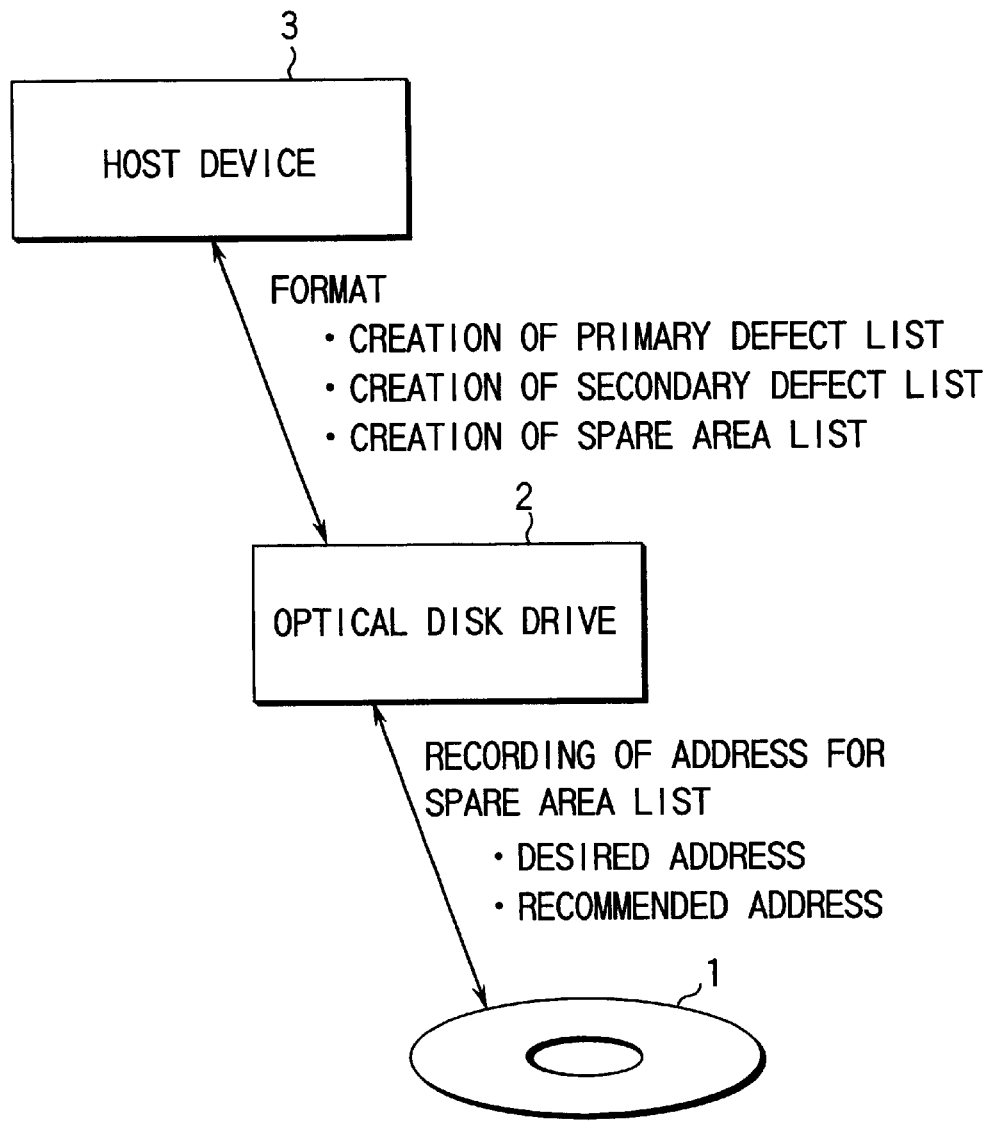
FIG. 13 is a diagram showing the state in which an optical disk drive having received an instruction of formatting from a host device formats the optical disk according to the instruction of formatting.

Next, recording of data on the optical disk is explained. As shown in FIG. 13, direct recording of data on an optical disk 1 is effected by an optical disk drive 2 connected to a host device 3. The host device 3 issues various instructions to the optical disk drive device 2. For example, the host device 3 issues a data recording instruction and recording data to the optical disk drive device 2. The optical disk drive device 2 receives and caches the recording data and sends back a response (response of write good when recording is good and response of write error when recording is no good). After this, the recording data cached by the optical disk drive device 2 is recorded on the optical disk 1. For example, suppose that the recording destination of the recording data is the zone n. Further, suppose that the replacement process is necessary in order to record the recording data in the zone n. Further, suppose that all of the spare areas arranged in the zone n are already used (spare full). In this case, the optical disk drive device 2 sends back a response of write error to the host device 3 and informs the host device 3 of the spare full state. Alternatively, the optical disk drive device 2 checks the remaining capacity of the spare area by use of the self-diagnostic function (S.M.A.R.T: Self-Monitoring Analysis and Reporting Technology) and informs the host device 3 of the spare full state. Information of the spare full state from the optical disk drive device 2 is received by a device driver belonging to an OS (operating system) of the host device 3 and notified to the OS. The OS receiving this issues an instruction of new allocation of the SSA.

Next, the replacement process is explained. In the replacement process, a slipping replacement process and linear replacement process are provided. The slipping replacement process is a process for a primary defect and is a replacement process effected in the unit of sector field. The linear replacement process is a process for a secondary defect and is a replacement process effected in the unit of ECC block data. The replacement process is also effected in a case of PID detection error other than the primary defect and secondary defect described above The detail thereof is explained below.

First, the slipping replacement process is explained. In the slipping replacement process, the PSA of the spare area is an object of the replacement destination. Strictly speaking, when the slipping replacement process is effected, the SSA is not arranged.

Before shipment of the optical disk, whether a defect (=primary defect) is present in the rewritable zone on the optical disk is certified (certify). That is, whether or not data can be normally recorded in the rewritable zone is certified. The certification is effected in the unit of sector field.

If a defective sector (=primary defective area indicating a sector field in which a primary defect is present) is detected during the certification, the physical sector number of the defective sector is recorded in the primary defect list. Further, to the defective sector, no logical sector number is attached. More specifically, the defective sector is skipped and logical sector numbers are serially attached only to the normal sectors (indicating sector fields containing no defect) arranged before and after the defective sector. That is, the defective sector is regarded as a non-existing sector. As a result, writing of user data into the above defective sector will not be effected. The above-described series of processes is the slipping replacement process. That is, in the slipping replacement process, the defective sector is slipped.

Further, the slipping replacement process is explained with reference to FIG. 8.

Figure 8:
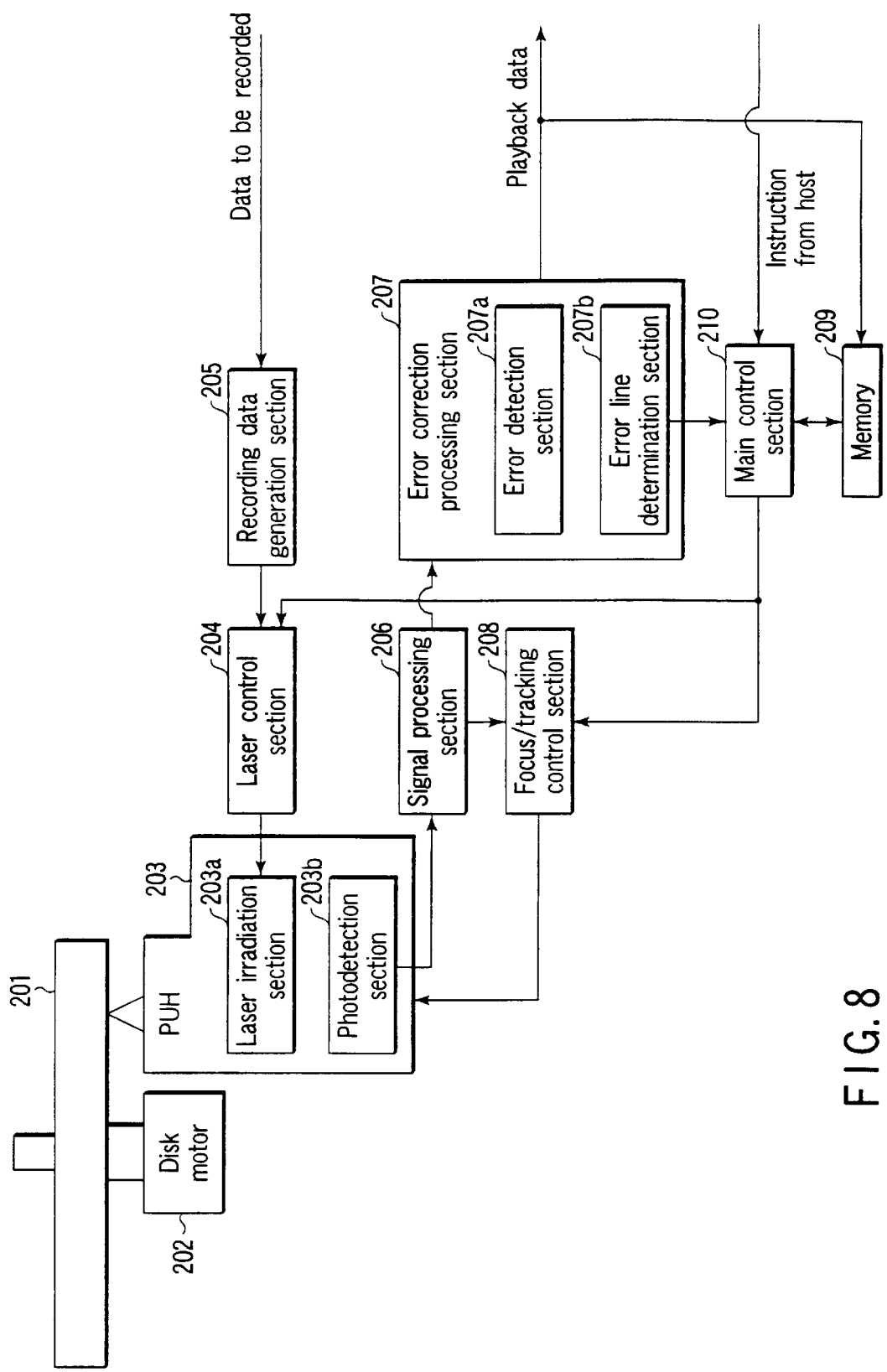
FIG. 8 is an explanatory diagram of a slipping replacement process.

As shown in FIG. 8, assume that a user area (user area UA shown in FIGS. 12A and 12B) and spare area (spare area SA shown in FIGS. 12A and 12B) exist (the spare area shown in FIG. 8 is the PSA). Assume that the user area and spare area are present in some positions of the zone 0 to zone N explained in FIG. 1 (a concrete example is explained later). Further, the existing position of the spare area is managed by the spare area list shown in FIGS. 7A and 7B.

For example, if a defective sector m and defective sector n are detected during the certification, both of the defective sectors are compensated for by use of the spare area. That is, the number of sectors constructing the user area shown in the upper stage of FIG. 8 is compensated for by the spare area. Further, as explained above, no logical numbers are attached to the defective sector m and defective sector n. More specifically speaking, the spare area is also an object area of the slipping replacement process. Therefore, if a defective sector is detected in the spare area, it is processed by the slip replacement process explained above. All of the sectors have physical sector numbers irrespective of the defective sector and normal sector.

Second, the linear replacement process is explained. In the linear replacement process, both of the PSA and SSA in the spare areas are objects of the replacement destination.

When user data is written after shipment of the optical disk, whether or not user data is normally written is verified (verify). A state in which the user data is not normally written is called a secondary defect. The presence or absence of the secondary defect is determined in the unit of 16 sector fields (ECC block field) in which ECC block data shown in FIG. 3 is recorded.

If a defective block (=secondary defective area: indicating an ECC block field containing the secondary defect) is detected, the physical sector number of a first sector of the defective block and the physical sector number of a first sector of a replacement block (indicating an ECC block field obtained in the spare area) of the replacement destination of the defective block are recorded in the secondary defect list. Further, logical sector numbers attached to, the 16 sector fields in the defective block are attached as they are to the 16 sector fields in the replacement block. As a result, data which has been recorded in the defective block is recorded in the replacement block. After this, access to the defective block is regarded as access to the replacement block. The above-described series of processes is the linear replacement process. That is, in the linear replacement process, the defective sector is linearly replaced.

Further, the linear replacement process is explained with reference to FIG. 9.

Figure 9:
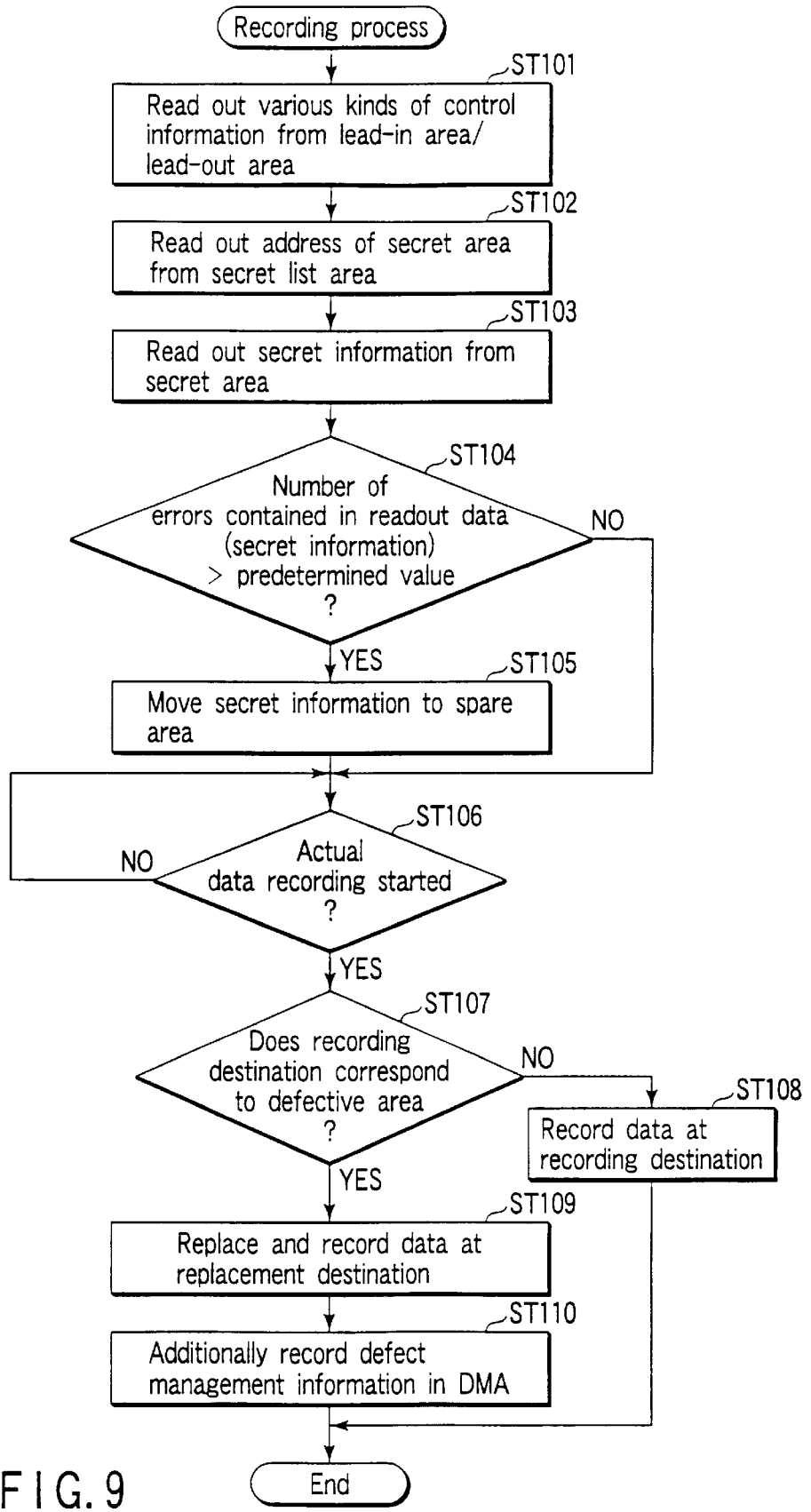
FIG. 9 is an explanatory diagram of a linear replacement process.

Assume that a user area (user area UA shown in FIGS. 12A and 12B) and a spare area (spare area SA shown in FIGS. 12A and 12B) are present (the spare area shown in FIG. 9 is the PSA or SSA) as shown in FIG. 9. Assume that the user area and spare area are present somewhere in the zone 0 to zone N as explained with reference to FIG. 1. Further, the existing position of the spare area is managed by the spare area list shown in FIGS. 7A and 7B.

For example, in a case where a defective block m and a defective block n are detected when user data is written, both of the defective blocks are compensated for by a replacement block of the spare area. Further, as explained before, logical sector numbers attached to 16 sector fields constructing the defective block m are succeeded to 16 sector fields constructing a replacement block m which is a replacement object of the defective block m. Likewise, logical sector numbers attached to 16 sector fields constructing the defective block n are succeeded to 16 sector fields constructing a replacement block n which is a replacement object of the defective block n. More specifically speaking, the spare area is also an object area of the linear replacement process. Therefore, if a defective area is detected in the spare area, it is processed by the above-explained linear replacement process. Irrespective of the defective block or normal block, all of the sector fields constructing the block have physical sector numbers.

Next, the writing process of user data corresponding to the slipping replacement process and linear replacement process described above is explained.

Writing of user data into the user area is effected based on the primary defect list and secondary defect list. That is, when user data is written into a certain sector field and if the sector field corresponds to a defective sector listed on the primary defect list, the defective sector is slipped and user data is written into a normal sector which is present next to the defective sector. Further, if a block which is a writing object of user data is a defective block listed on the secondary defect list, the user data is written into a replacement block corresponding to the defective block.

Next, the format of the optical disk is explained.

In a FAT (file allocation table) which is frequently used in a file system of information recording media (such as a hard disk and magneto-optical disk) for personal computers, information is recorded on a information recording medium with 256 bytes or 512 bytes used as the minimum unit.

On the other hand, in information recording media such as a DVD-video, DVD-ROM, DVD-R, DVD-RAM and the like, ISO13346 and UDF (universal disk format) defined by OSTA as the file system are used. In this case, information is recorded on a information recording medium with 2048 bytes used as the minimum unit. As the management method, a hierarchical file system basically having a route directory as a parent, for managing the file in a tree form is considered as a premise.

As shown in FIG. 13, formatting of the optical disk 1 is effected by the optical disk drive 2 connected to the host device 3. The host device 3 issues various instructions to the optical disk drive device 2. The optical disk drive device 2 effects various operations in response to the instructions transmitted from the host device 3.

For example, as shown in FIG. 13, if an instruction of execution of the format is transmitted from the host device 3 to the optical disk drive device 2, the optical disk drive device 2 formats the optical disk 1 according to the instruction. That is, a preset format according to the instruction of the host device 3 is formed on the optical disk 1. At the time of formatting, for example, a primary defect list, secondary defect list and spare area list are formed with respect to the defect management area provided in the lead-in area A1 of the optical disk 1. That is, data for forming the primary defect list, secondary defect list and spare area list is transmitted from the host device 3 to the optical disk drive 2. The optical disk drive 2 stores data for forming the lists and forms the lists in the defect management area of the optical disk 1 according to the stored data.

Recording of attribute data and the like with respect to the spare area list is effected by the optical disk drive 2 according to the instruction transmitted from the host device 3. Assume that recording of attribute data and the like with respect to the spare area list is effected at least one of the timings of formatting time, certifying time (time of certification of a primary defect) and write time (time of recording of user data). That is, recording of attribute data of the spare area and the like with respect to the spare area list may be effected only at the formatting time, only at the certifying time or only at the write time, or may be effected at the formatting time and certifying time, at the formatting time and write time, at the certifying time and write time, or at the formatting time, certifying time and write time. In other words, the spare area is acquired at the above timings according to the instruction from the host device 3. Further, in addition to the above timings, the spare area is acquired at the timing at which the optical disk drive 3 determines that the spare area is insufficient. In short, the spare area acquired at the formatting time and certifying time is the above-described PSA and the spare area acquired at the write time and spare area insufficient time is the above-described SSA.

Figure 14:
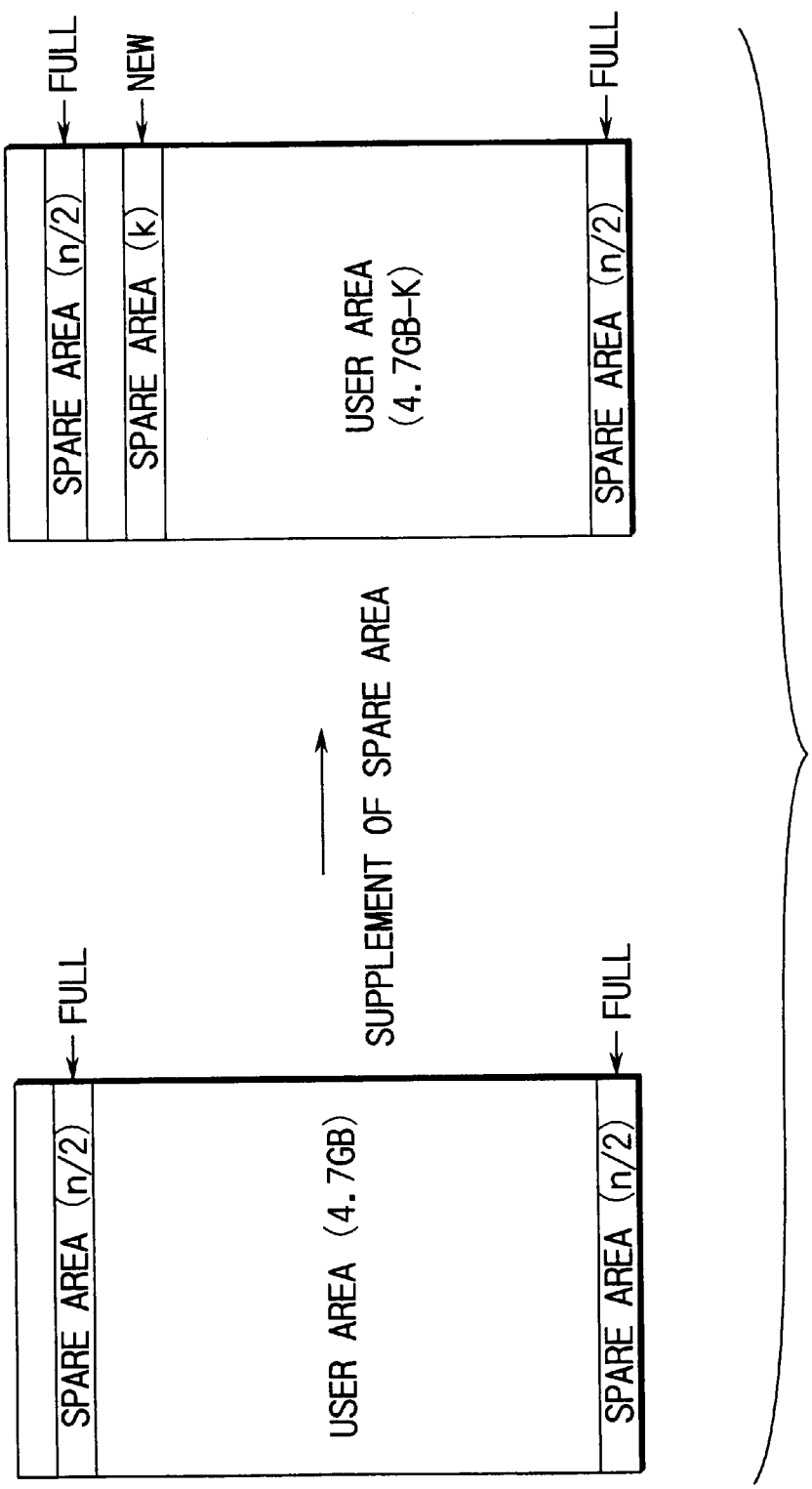
FIG. 14 is an explanatory diagram for addition of a spare area.

Thus, if the spare area is acquired not only at the formatting time but also at the certifying time and write time, a spare area (SSA) can be newly added as shown in FIG. 14 even in a case where the capacity of the spare area (PSA) acquired at the formatting time by the slipping replacement process and linear replacement process becomes insufficient. Insufficiency of the capacity of the spare area is transmitted from the optical disk drive 2 to the host device 3 and an instruction of addition of the spare area is issued from the host device 3 to the disk drive 2. The optical disk drive device 2 which has received the instruction adds a spare area (SSA) on the optical disk 1 according to the instruction. If the spare area (SSA) is newly added, the capacity of the user area is reduced accordingly.

As explained above, the information recording medium (optical disk) has the spare area list and can acquire the spare area of a desired capacity in a desired position. Thus, the storage capacity of the information recording medium can be effectively utilized to the maximum degree. Further, an adequate process can be effected for the spare area by the attribute data contained in the spare area list. For simplicity, for example, it is possible to extend the position of the added spare (SSA) from the rear portion of the last zone towards the head direction. In this case, the management of the added spare (SSA) position becomes easier and the size of the SAL for spare area management can be reduced.

Certification for the optical disk is not always effected and can be omitted in some cases. Further, in order to synchronize the hierarchical file system (spare area list by the instruction of the host device 3) as described before with the spare area list managed in the optical disk drive, de-flag (re-arrangement) may be inhibited in some cases.

Next, acquirement of the spare area is explained.

Figure 10:
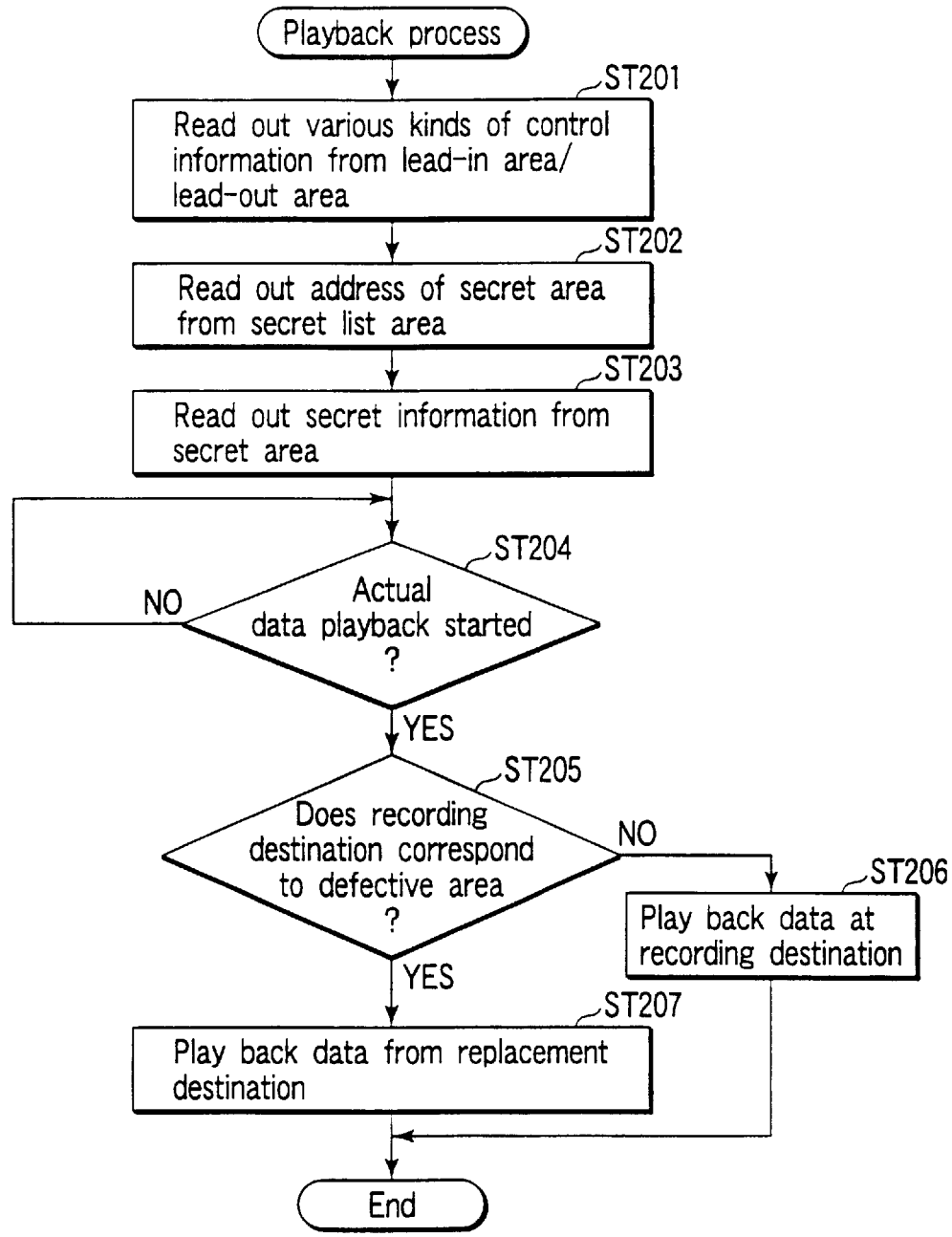
FIG. 10 is a diagram showing variations in the capacities of the user area and spare area before a certify process and after the certify process.

As shown in FIG. 10, prior to the certification process, the user area is 4.7 GB and the spare area is 26 MB. After the certification process, the user area is 4.7 GB and the spare area is 26 MB–m (the total size of the defective area)=n. That is, the user area of 4.7 GB is acquired before and after the certification process.

As the pattern of the acquirement of the spare area, five models as shown in FIGS. 11A to 11E are considered, for example. Of course, various patterns are considered other than the above case. The above five patterns can be realized by storing the length and the physical address number of a sector in the start position of the spare area n with respect to the spare area list. Alternatively, it can be realized by storing the physical address number of a sector in the start position of the spare area n and the physical address number of a sector in the end position.

Figure 11A:
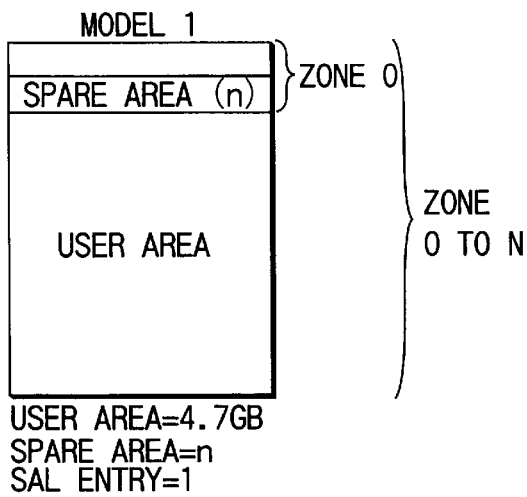
FIGS. 11A to 11E are diagrams showing models 1 to 5 in one example of the acquirement of the spare area.

The model 1 shown in FIG. 11A is a case wherein the spare area (capacity n) is acquired only in the zone 0. In the case of the model 1, the user area is 4.7 GB, the capacity of the spare area is n, and the entry number of the spare area is 1. By causing the spare area list to contain information for defining the spare area of the capacity n in the zone 0, the model 1 can be realized.

Figure 11B:
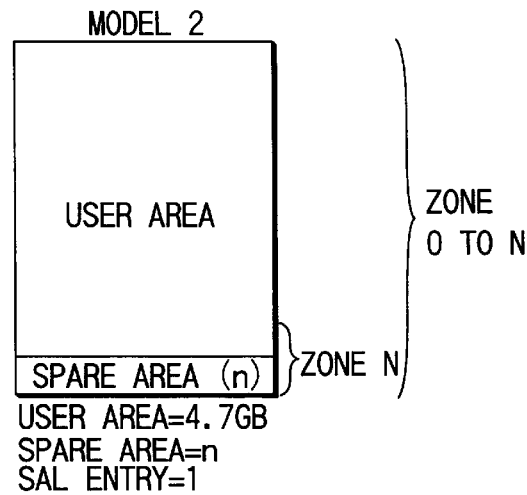

The model 2 shown in FIG. 11B is a case wherein the spare area (capacity n) is acquired only in the zone N. In the case of the model 2, the user area is 4.7 GB, the capacity of the spare area is n, and the entry number of the spare area is 1. By causing the spare area list to contain information for defining the spare area of the capacity n in the zone N, the model 2 can be realized.

Figure 11C:
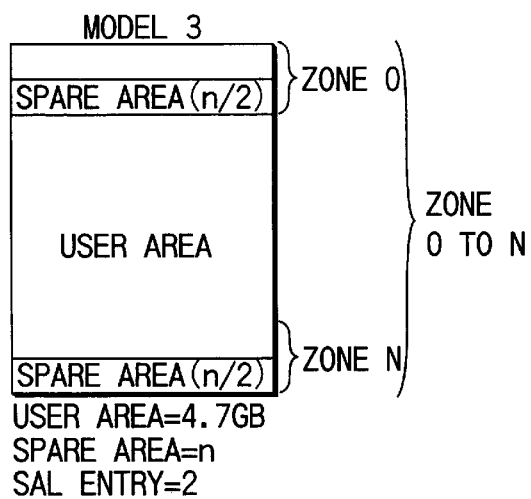

The model 3 shown in FIG. 11C is a case wherein the spare areas (capacity n/2) are acquired in the zone 0 and zone N. In the case of the model 1, the user area is 4.7 GB, the capacity of the spare area is n (2×n/2), and the entry number of the spare areas is 2. By causing the spare area list to contain information for defining the spare area of the capacity (n/2) in the zone 0 and information for defining the spare area of the capacity (n/2) in the zone N, the model 3 can be realized.

Figure 11D:
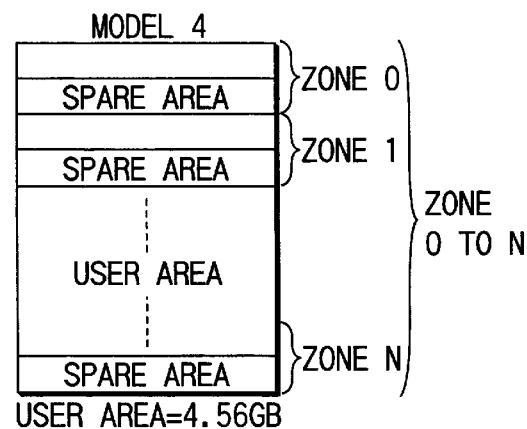

The model 4 shown in FIG. 11D is a case wherein the spare areas are acquired in the zone 0, zone 1, zone 2, . . . , zone N. In the case of the model 4, the user area is 4.56 GB and the entry number of the spare areas is (N+1). By causing the spare area list to contain information for defining the spare area of a preset capacity in the zones 0 to N (all of the zones), the model 4 can be realized.

Figure 11E:
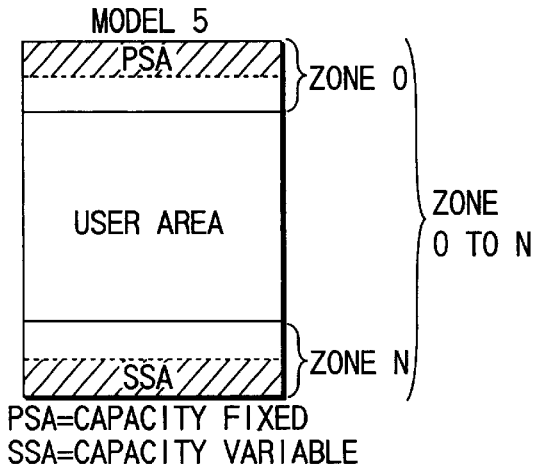

The model 5 shown in FIG. 11E is a case wherein the spare areas are acquired in the zone 0 and zone N. Further, the spare area acquired in the zone 0 is the PSA having fixed size and the spare area acquired in the zone N is the SSA having variable size. The spare area list is caused to contain information for defining the PSA of preset size (fixed size) in the zone 0 and the spare area list is caused to contain information for defining the SSA of preset size (variable size) in the zone N. As a result, the model 5 can be realized.

The model 1 to model 5 described above may be realized as recommended models of the spare area. That is, when the address of the spare area is recorded in the spare area list, addresses (recommended addresses) for realizing the model 1 to model 5 by the optical disk drive 2 can be automatically recorded.

Alternatively, the optical disk may be caused to have addresses (recommended addresses) for realizing the model 1 to model 5 as default data. Then, it is possible to easily acquire the spare area as shown in the model 1 to model 5 by causing the optical disk drive 2 to simply specify one of the model 1 to model 5. Recording destinations of the addresses (recommended addresses) for realizing the model 1 to model 5 are the lead-in area (such as the DMA) and the lead-out area.

In the conventional information recording medium (DVD-RAM), the position and storage capacity of the spare area have been determined by the previously specified format. Therefore, there occurs a problem that the spare area becomes excessive or insufficient.

On the other hand, the information recording medium of this invention can acquire the spare area of a desired capacity in a desired position by having a spare area list. That is, expansion and contraction of the spare area can be freely attained and the spare area corresponding to the application of the information recording medium can be acquired. As a result, the capacity of the information recording medium can be effectively utilized. Further, an adequate process can be effected for the spare area by causing the spare area list to contain attribute data.

Figure 16:
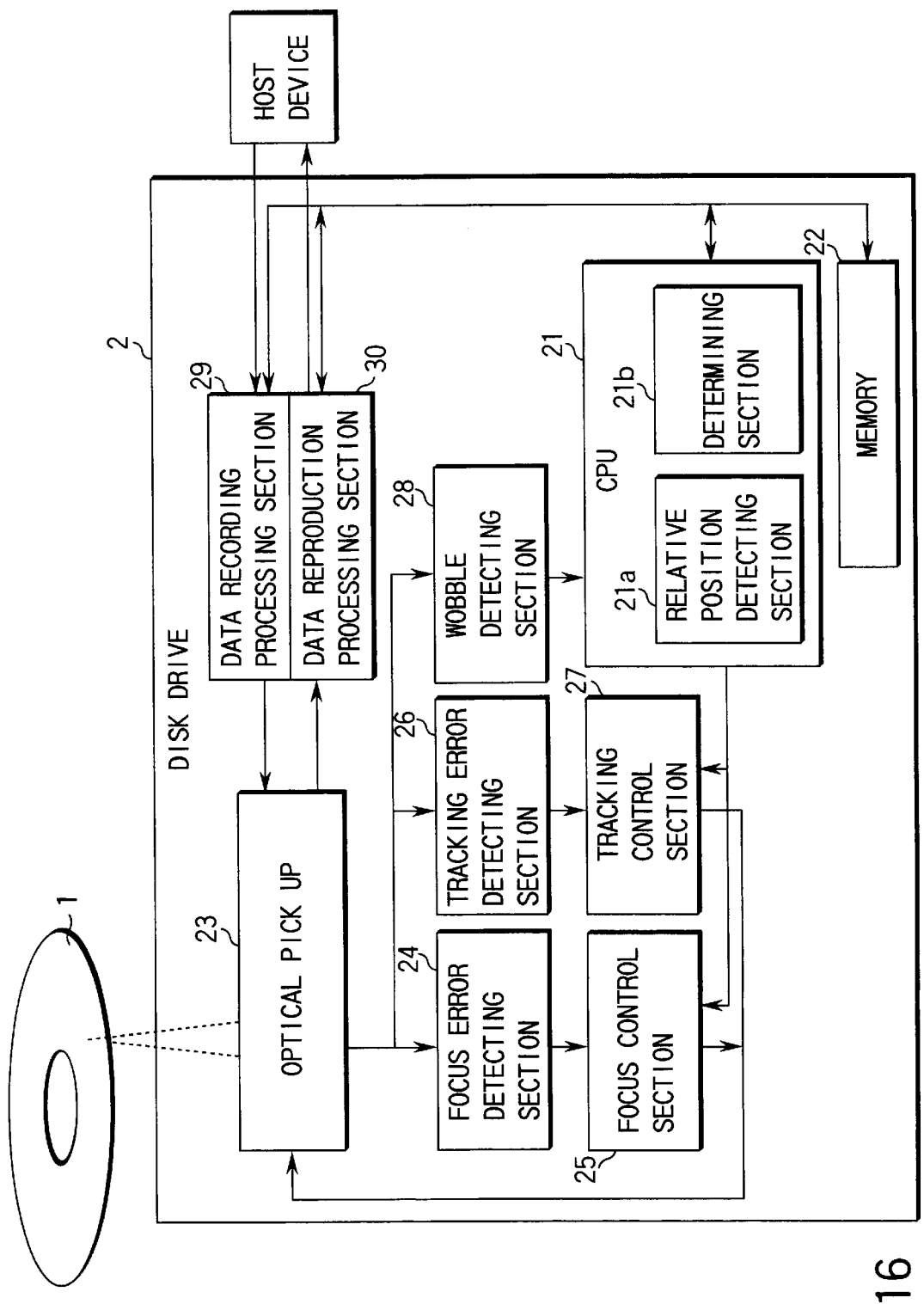
FIG. 16 is a schematic diagram showing an information recording/reproducing apparatus relating to an information recording apparatus and information reproducing apparatus of this invention.

Next, an information recording/reproducing apparatus for recording data on the information recording medium described above and reproducing data recorded on the information recording medium is explained with reference to FIG. 16.

The information recording/reproducing apparatus includes an optical disk drive 2 and host device 3. The disk drive 2 includes a CPU 21, memory 22, optical pickup section 23, focus error detecting section 24, focus control section 25, tracking error detecting section 26, tracking control section 27, wobble detecting section 28, data recording processing section 29 and data reproduction processing section 30 and the like.

The CPU 21 controls the respective sections of the disk drive 2. In the memory 22, preset data is stored. The optical pickup section 23 illuminates a light beam for reproduction on the optical disk to detect reflected light from the optical disk. The data reproduction processing section 30 reproduces data recorded on the optical disk based on the result of detection of the reflected light detected by the optical pickup section 23. On the other hand, the data recording processing section 29 creates ECC block data based on recording data provided from the host device 3 and further creates sector data from the ECC block data. The optical pickup section 23 illuminates a light beam for recording on which the sector data created by the data recording processing section 29 is reflected and records data on the optical disk.

The focus error detecting section 24 detects a focus error of the light beam illuminated by the optical pickup section 23 based on the result of detection of the reflected light detected by the optical pickup section 23. The focus control section 25 controls the focus of the light beam illuminated by the optical pickup section 23 based on the focus error detection result detected by the focus error detecting section 24.

The tracking error detecting section 26 detects a tracking error of the light beam illuminated by the optical pickup section 23 based on the result of detection of the reflected light detected by the optical pickup section 23. The tracking control section 27 controls tracking of the light beam illuminated by the optical pickup section 23 based on the tracking error detection result detected by the tracking error detecting section 26.

The wobble detecting section 28 detects the wobble of the track on the optical disk and supplies the wobble detection result to a relative position detecting section 21a in the CPU 21. The relative position detecting section 21a counts the wobble based on the wobble detection result and detects the relative position on the optical disk.

Further, a determining section 21b in the CPU 21 determines a defective sector and defective block based on data reproduced by the data reproduction processing section 30. Replacement recording (slip replacement process and linear replacement process) is effected by controlling the respective sections by the CPU 21 based on the determination result of the determining section 21b. Further, reproduction of data which is replacement-recorded is effected by controlling the respective sections by the CPU 21.

Figure 17:
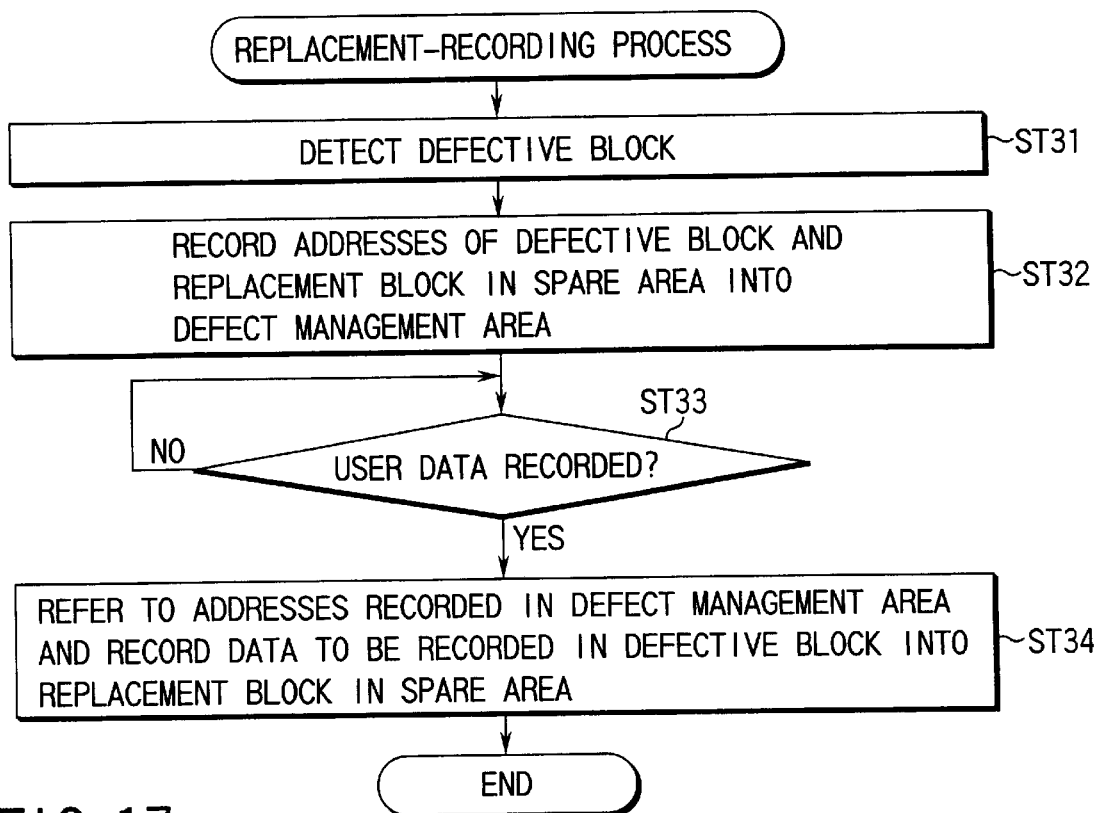
FIG. 17 is a flowchart showing a replacement-recording process.

The replacement-recording process is explained with reference to the flowchart shown in FIG. 17.

In a case where a defective block is detected by determination of the determining section 21b (ST31), data is recorded on the secondary defect list of the defect management area by the data recording processing section 29 as follows. That is, address data (physical address number of a sector in the start position of the defective block) indicating the position of the defective block and address data (physical address number of a sector in the start position of the replacement block) indicating the position of the replacement block in the spare area which is the replacement destination of the defective block are recorded in connection with each other on the secondary defect list of the defect management area (ST32).

At the data recording time (ST33, YES) the secondary defect list of the replacement management area is reproduced by the data reproduction processing section 30. Information to be recorded in the defective block is replacement-recorded in the replacement block in the spare area which is the replacement destination of the defective block by the data recording processing section 29 based on address data of the secondary defect list obtained by the above reproduction (ST34).

Figure 18:
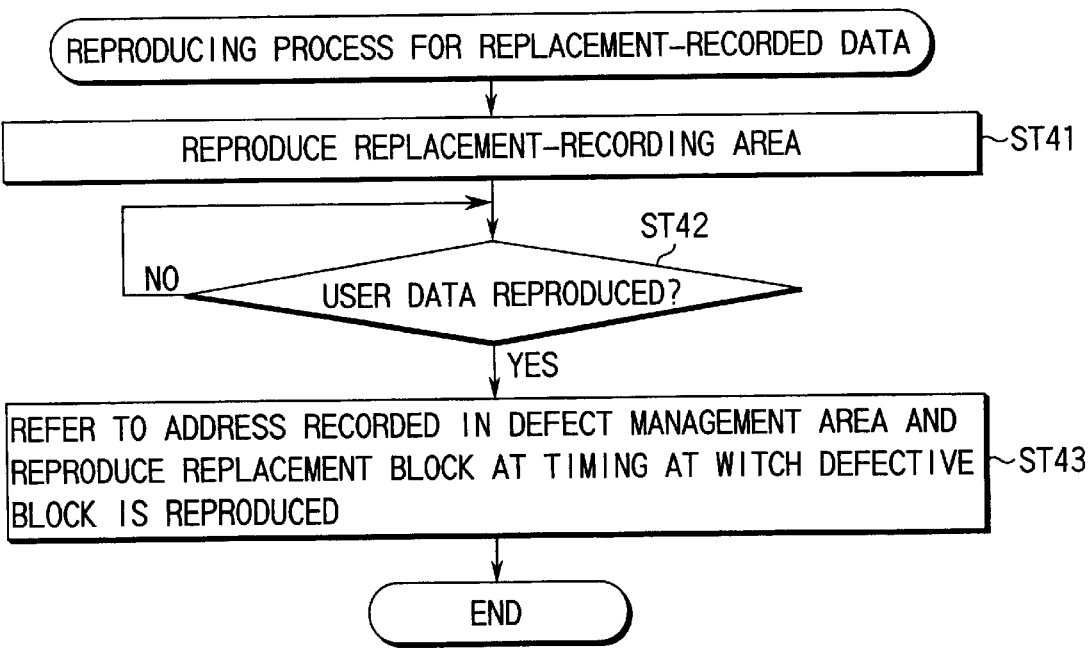
FIG. 18 is a flowchart for illustrating a replacement-reproducing process for reproducing data replacement-recorded by the replacement-recording process.

The reproduction process of data which is replacement-recorded is explained with reference to the flowchart of FIG. 18.

First, the primary defect list and secondary defect list of the replacement management area are reproduced by the data reproduction processing section 30 (ST41). From the secondary defect list, address data (physical address number of a sector in the start position of the defective block) indicating the position of the defective block recorded in the secondary defect list of the replacement management area and address data (physical address number of a sector in the start position of the replacement block) indicating the position of the replacement area in the spare area which is the replacement destination of the defective block are reproduced.

At the time of data reproduction (ST42), information of the replacement block in the spare area which is the replacement destination of the defective block is reproduced (ST43) at timing at which information of the defective block is reproduced by the data reproduction processing section 30 based on the address data reproduced from the secondary defect list of the replacement management area.

User data to be recorded in the defective block can be recorded in the replacement block in the spare area defined by a desired capacity in a desired position by the replacement-recording process explained above. Further, user data recorded in the replacement block in the spare area defined by a desired capacity in a desired position can be reproduced at timing at which the defective block is reproduced by the reproduction process explained above.

According to this invention, the following information recording medium, information recording apparatus, information recording method, information reproducing apparatus and information reproducing method can be provided.

(1) An information recording medium capable of suppressing a reduction in the effective space of a data area due to the arrangement of a spare area in a case where the spare area is arranged in the data area as a replacement area.

(2) An information recording apparatus and information recording method for replacement-recording preset information with respect to an information recording medium capable of suppressing a reduction in the effective space of a data area due to the arrangement of a spare area in a case where the spare area is arranged in the data area as a replacement area.

(3) An information reproducing apparatus and information reproducing method for reproducing preset information replacement-recorded on an information recording medium capable of suppressing a reduction in the effective space of a data area due to the arrangement of a spare area in a case where the spare area is arranged in the data area as a replacement area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium having a data area which includes a plurality of zones, each one of which includes a plurality of sectors, comprising:

a defect management area which contains information for defining a spare area for compensating for a defective area; and a spare area allocated in a predetermined zone of the data area, based on the information for defining the spare area contained in the defect management area, wherein the defect management area includes a first area, a second area and a third area;

the first area includes a sector number of a first sector in a spare area of fixed capacity as information for defining the spare area of fixed capacity in a first zone of the plurality of zones contained in the data area;

the second area includes an area for storing a sector number of a defective sector contained in the data area;

the defective sector is a sector to be an object of a slipping replacement process;

the spare area of fixed capacity is an area which is used instead of the defective sector detected in the slipping replacement process;

the third area includes an area for storing a sector number of a first sector in a spare area of variable capacity which is allocated in a last zone of the plurality of zones, as necessary, and includes an area for storing a sector number of a first sector in a defective block and a sector number of a first sector in a replacement block in the spare area in connection with each other;

the defective block is a block to be an object of a linear replacement process;

the spare area of fixed capacity and the spare area of variable capacity are areas which are used instead of the defective block detected in the linear replacement process; and the spare area of fixed capacity before the slipping replacement process is performed is given a sector number without being given a logical sector number.

2. The information recording medium according to claim 1, wherein the spare area of variable capacity is an area which is allocated when the spare area of fixed capacity is exhausted.

3. The information recording medium according to claim 1, wherein the spare area of variable capacity is an area expandable toward a top of the data area.

4. An information recording apparatus for recording information on an information recording medium having a data area which includes a plurality of zones, each one of which includes a plurality of sectors, the information recording medium comprising:

a defect management area which contains information for defining a spare area for compensating for a defective area; and a spare area allocated in a predetermined zone of the data area, based on the information for defining the spare area contained in the defect management area, wherein the defect management area includes a first area, a second area and a third area;

the first area includes a sector number of a first sector in a spare area of fixed capacity as information for defining the spare area of fixed capacity in a first zone of the plurality of zones contained in the data area;

the second area includes an area for storing a sector number of a defective sector contained in the data area;

the defective sector is a sector to be an object of slipping replacement process;

the spare area of fixed capacity is an area which is used instead of the defective sector detected in the slipping replacement process;

the third area includes an area for storing a sector number of a first sector in a spare area of variable capacity which is allocated in a last zone of the plurality of zones as necessary, and includes an area for storing a sector number of a first sector in a defective block and a sector number of a first sector in a replacement block in the spare area in connection with each other;

the defective block is a block to be an object of a linear replacement process;

the spare area of fixed capacity and the spare area of variable capacity are areas which are used instead of the defective block detected in the linear replacement process; and the spare area of fixed capacity before the slipping replacement process is performed is given a sector number without being given a logical sector number;

the information recording apparatus comprising:

a first recording means which records the sector number of the defective sector contained in the data area;

a second recording means which records in the third area the sector number of the first sector in the defective block and the sector number of the first sector in the replacement block in the spare area in connection with each other;

a third recording means which replacement-records information which is to be recorded in the defective block in the replacement block in the spare area, which is the replacement destination of the defective block, based on both sector numbers recorded in the third area in connection with each other.

5. An information recording method of recording information on an information recording medium having a data area which includes a plurality of zones each of which includes a plurality of sectors, the information recording medium comprising:

a defect management area which contains information for defining a spare area for compensating for a defective area; and a spare area allocated in a predetermined zone of the data area, based on the information for defining the spare area contained in the defect management area, wherein the defect management area includes a first area, a second area and a third area;

the first area includes a sector number of a first sector in a spare area of fixed capacity as information for defining the spare area of fixed capacity in a first zone of the plurality of zones contained in the data area;

the second area includes an area for storing a sector number of a defective sector contained in the data area;

the defective sector is a sector to be an object of a slipping replacement process;

the spare area of fixed capacity is an area which is used instead of the defective sector detected in the slipping replacement process;

the third area includes an area for storing a sector number of a first sector in a spare area of variable capacity which is allocated in a last zone of the plurality of zones as necessary, and includes an area for storing a sector number of a first sector in a defective block and a sector number of a first sector in a replacement block in the spare area in connection with each other;

the defective block is a block to be an object of a linear replacement process;

the spare area of fixed capacity and the spare area of variable capacity are areas which are used instead of the defective block detected in the linear replacement process; and the spare area of fixed capacity before the slipping replacement process is performed is given a sector number without being given a logical sector number, the information recording method comprising the steps of:
  recording the sector number of the defective sector in the data area in the second area;
  recording in the third area, the sector number of the first sector in the defective block and the sector number of the first sector in the replacement block in the spare area in connection with each other; and
  replacement-recording information, which is to be recorded in the defective block, in the replacement block in the spare area which is the replacement destination of the defective block, based on both sector numbers recorded in the third area in connection with each other.

6. An information reproducing apparatus for reproducing information recorded on an information recording medium having a data area which includes a plurality of zones each of which includes a plurality of sectors, the information recording medium comprising:
  a defect management area which contains information for defining a spare area for compensating for a defective area; and
  a spare area allocated in a predetermined zone of the data area, based on the information for defining the spare area contained in the defect management area,
  wherein the defect management area includes a first area, a second area and a third area;
  the first area includes a sector number of a first sector in a spare area of fixed capacity as information for defining the spare area of fixed capacity in a first zone of the plurality of zones contained in the data area;
  the second area includes an area of storing a sector number of a defective sector contained in the data area;
  the defective sector is a sector to be an object of a slipping replacement process;
  the spare area of fixed capacity is an area which is used instead of the defective sector detected in the slipping replacement process;
  the third area includes an area for storing a sector number of a first sector in a spare area of variable capacity which is allocated in a last zone of the plurality of zones as necessary, and includes an area for storing a sector number of a first sector in a defective block and a sector number of a first sector in a replacement block in the spare area in connection with each other;
  the defective block is a block to be an object of a linear replacement process;
  the spare area of fixed capacity and the spare area of variable capacity are areas which are used instead of the defective block detected in the linear replacement process; and
  the spare area of fixed capacity before the slipping replacement process is performed is given a sector number without being given a logical sector number, the information reproducing apparatus comprising:
  a first reproducing means for reproducing the third area in which the sector number of the first sector in the defective block and the sector number of the first sector in the replacement block in the spare area are recorded in connection with each other; and
  a second reproducing means for reproducing information which is to be reproduced from the defective block, from the replacement block in the spare area, which is the replacement destination of the defective block, based on both sector numbers reproduced the first reproducing means.

7. An information reproducing method of reproducing information recorded on an information recording medium having a data area which includes a plurality of zones, each one of which includes a plurality of sectors, the information recording medium comprising:
  a defect management area which contains information for defining a spare area for compensating for a defective area; and
  a spare area allocated in a predetermined zone of the data area, based on the information for defining the spare area contained in the defect management area,
  wherein the defect management area includes a first area, a second area and a third area;
  the first area includes a sector number of a first sector in a spare area of fixed capacity as information for defining the spare area of fixed capacity in a first zone of the plurality of zones contained in the data area;
  the second area includes an area for storing a sector number of a defective sector contained in the data area;
  the defective sector is a sector to be an object of a slipping replacement process;
  the spare area of fixed capacity is an area which is used instead of the defective sector detected in the slipping replacement process;
  the third area includes an area for storing a sector number of a first sector in a spare area of variable capacity which is allocated in a last zone of the plurality of zones as necessary, and includes an area for storing a sector number of a first sector in a defective block and a sector number of a first sector in a replacement block in the spare area in connection with each other;
  the defective block is a block to be an object of a linear replacement process;
  the spare area of fixed capacity and the spare area of variable capacity are areas which are used instead of the defective block detected in the linear replacement process; and
  the spare area of fixed capacity before the slipping replacement process is performed is given a sector number without being given a logical sector number, the information reproducing method comprising the steps of:
  reproducing the third area in which the sector number of the first sector in the defective block and the sector number of the first sector in the replacement block in the spare area are recorded in connection with each other; and
  reproducing information which is to be reproduced from the defective block, from the replacement block in the spare areas, which is the replacement destination of the defective block, based on both sector numbers.

* * * * *